United States Patent [19]
Theisen et al.

[11] Patent Number: 5,877,775
[45] Date of Patent: Mar. 2, 1999

[54] METHOD OF GENERATING A 3-D REPRESENTATION OF A HIERARCHICAL DATA STRUCTURE

[76] Inventors: Karen E. Theisen, 1545 Hampshire St., Apt. 7, San Francisco, Calif. 94110; Eugene Jhong, 226 Lincoln Ave. #2, Redwood City, Calif. 94061

[21] Appl. No.: 907,207

[22] Filed: Aug. 6, 1997

Related U.S. Application Data

[60] Provisional application No. 60/022,429 Aug. 8, 1996.

[51] Int. Cl.⁶ ..................................................... G06F 15/00
[52] U.S. Cl. ............................................................ 345/440
[58] Field of Search .................................... 345/440, 441, 345/433, 333, 334

[56] References Cited

U.S. PATENT DOCUMENTS

| | | | |
|---|---|---|---|
| 4,524,421 | 6/1985 | Searby et al. | 358/903 |
| 5,592,599 | 1/1997 | Lindholm | 395/127 |

OTHER PUBLICATIONS

Mark Walter, "MAPA Product Overview–Full Strength Mapping For the World Wide Web", Seybold Report On Internet Publishing, pp.1–21, (Jan. 31, 1997).

Manojit Sarkar & Marc H. Brown, "Graphical Fisheye Views", Communications Of The ACM, pp. 73–84, (Dec. 1994), vol. 37, No. 12.

David Turo, "Hierarchical Visualization With Treemaps: Making Sense Of Pro Basketball Data", Conference Companion—CHI '94, pp. 441–442, (Apr. 24–28, 1994).

George G. Robertson, et al., "Cone Trees: Animated 3D Visualizations of Hierarchical Information", Proceedings Of The ACM SIGCHI '91, pp. 189–194,(1991).

John Lamping, et al., "A focus+Context Technique Based On Hyperbolic Geometry For Visualizing Large Hierarchies", Mosaic Of Creativity—CHI '95, pp. 401–408, (May 7–11, 1995).

*Primary Examiner*—Phu K. Nguyen
*Attorney, Agent, or Firm*—Blakely, Sokoloff, Taylor & Zafman

[57] ABSTRACT

A method of generating a three-dimensional representation of a hierarchical data structure is disclosed. By taking advantage of a compact three-dimensional representation, the present invention provides an overview of an entire hierarchy of files so as to facilitate use orientation within the hierarchical data structure. The method commences with the generation of a hierarchical data structure, which is then mapped onto a two-dimensional grid by assigning each node in the hierarchical data structure X and Y axis coordinates. A Z axis, which may be at an angle of 30° relative to an X axis, is then defined. Within each level within the hierarchical data structure, a Z line is then defined as being parallel to the Z axis and as intersecting the level. Thereafter, for each level, each node is mapped from a location on a Y line to a corresponding location on the defined Z line, so that at least the Y coordinate for each node is recalculated. A node representation for each node is then displayed at a first point defined by the respective X coordinate and the recalculated Y coordinate on a display unit. A connector representation is then displayed between each parent and child node on the display unit.

15 Claims, 29 Drawing Sheets

METHOD OF GENERATING A 3-D REPRESENTATION OF A HIERARCHICAL DATA STRUCTURE

This application claims the benefit of U.S. Provisional Application Ser. No. 60/022,429, filed Aug. 8, 1996.

FIELD OF THE INVENTION

The present invention relates generally to the field of graphical user interfaces and, more specifically, to a method of representing a hierarchical data structure in a three-dimensional manner.

BACKGROUND OF THE INVENTION

Existing methods employed within graphical user interfaces (GUIs) to visualize and manage large amounts of data suffer from a number of shortcomings. Beginner users of the GUIs of many major operating systems often experience disorientation and confusion due in part to the segmented and discontinuous presentation of directories, sub-directories and files, where only a portion of the relevant data is displayed at any one time. As a data set becomes larger, this problem is exacerbated.

In the context of the World Wide Web (WWW), a user may often become disorientated within a web site. Both users and web masters also often require a concise and easy-assimilated overview of the structure of the web site.

SUMMARY OF THE INVENTION

According to a first aspect of the invention, there is provided a computer-implemented method of generating a three-dimensional representation of a hierarchical data structure. The data structure includes a number of nodes, each of which represents a data item. The method commences with the generation of the hierarchical data structure, whereafter a pair of X and Y axes coordinates are assigned to each node. The X and Y axes are perpendicular, and nodes on a common level within the hierarchical data structure each have a common Y axis coordinate to define a Y line for the respective level. A Z axis is then defined at a predetermined angle relative to the X axis. For each level, a Z line is then defined. Each Z line is parallel to the Z axis, and intersects a respective Y line at an intersection point. For each level, each node location on the respective Y line is then mapped to a corresponding location on the respective Z line, so as to recalculate at least the Y coordinate for each node. Thereafter, a node representation is displayed on a display unit at a respective first point defined by the respective X and Y coordinates, as recalculated. A connector representation is also displayed between each parent and child node representation, so as to create the three-dimensional representation.

According to a second aspect of the invention, there is provided a computer-readable medium having stored thereon a sequence of instructions which, when executed by a processor, cause the processor to perform the steps outlined above.

According to a third aspect of the invention, there is provided a computer data signal embodied in a carrier wave and representing a sequence of instructions which, when executed by a processor, cause the processor to perform these steps outlined above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of generating a three-dimensional (3D) representation of a hierarchical data structure is described. In the following description, for the purposes of explanation, numerous specific details are set forth in order to provide a thorough understanding of the present invention. It will be evident, however, to one skilled in the art that the present invention may be practiced without the specific details.

A number of methods of representing hierarchical data are known in the art. For example, the Macintosh™ and Windows™ operating systems (OS) each include a GUI, which displays files and application programs in either folders or directories. However, as detailed above, these representations suffer from a number of drawbacks. The present invention proposes representing a hierarchical data structure in a manner which enhances perception of the tree structure, and facilitates simple and clear navigation within the hierarchical data structure.

Figure 1:
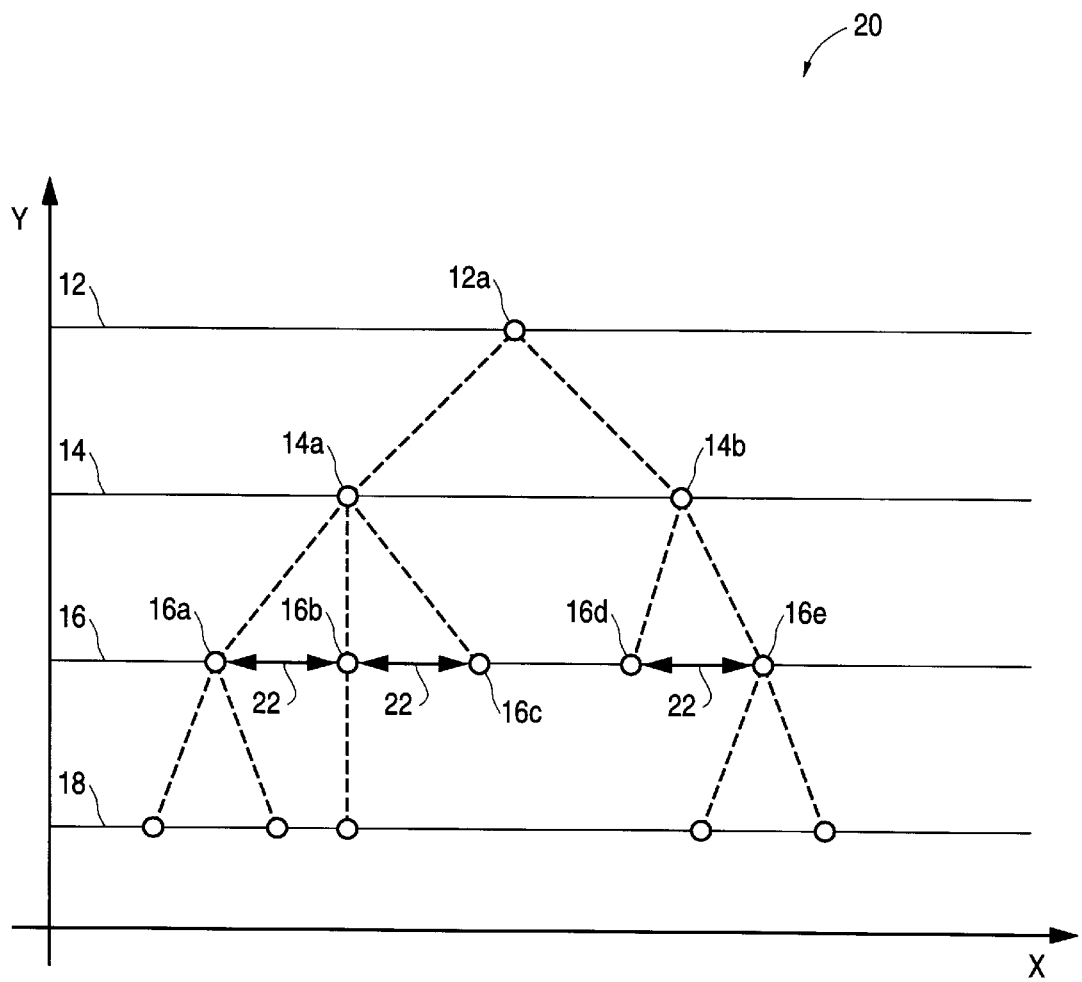
FIG. 1 illustrates the generation of a two-dimensional representation of a hierarchical data structure utilizing non-graphical data and according to a method of the present invention.
Figure 2A:
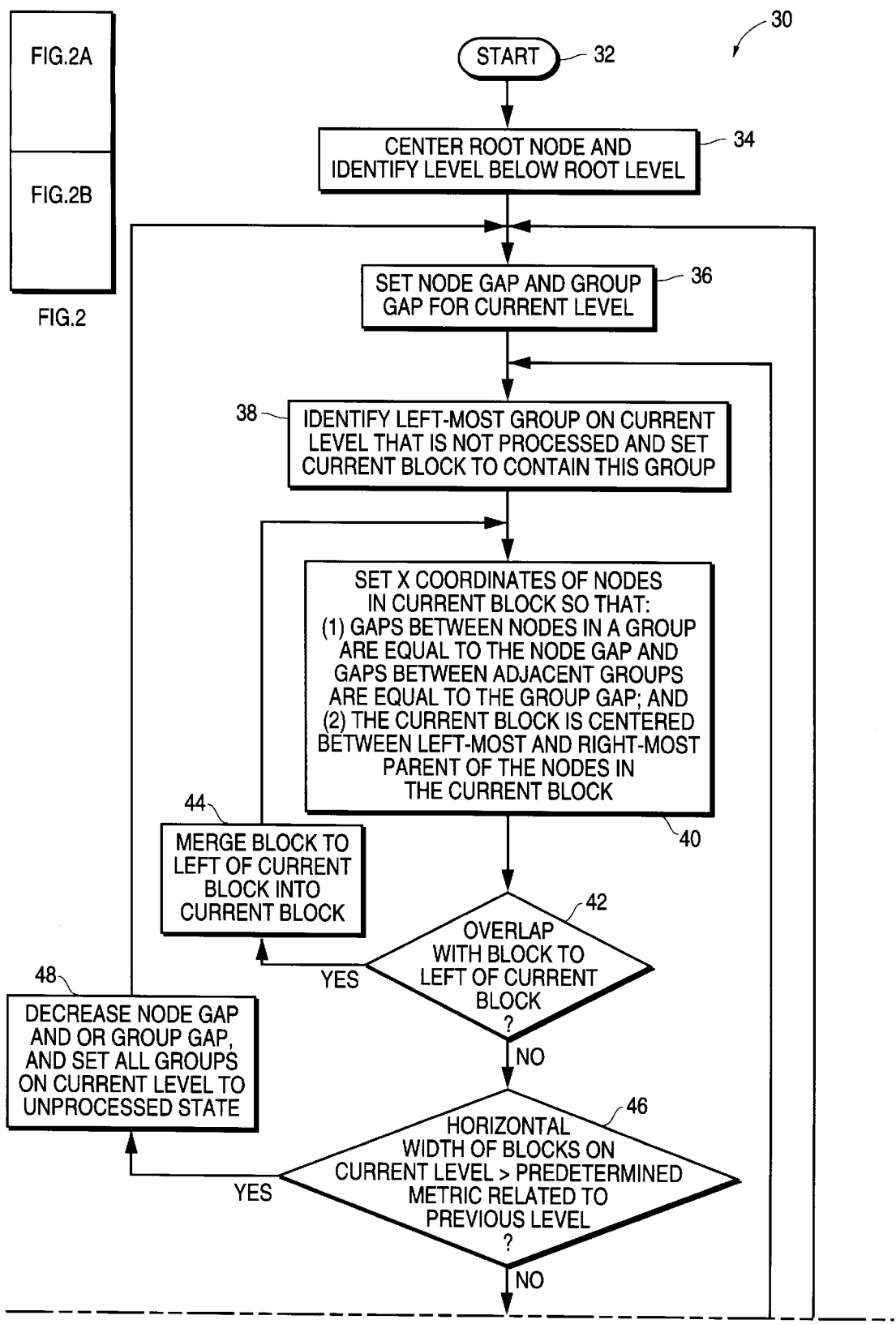
FIG. 2 is a flow chart illustrating a method, according to one embodiment of the present invention, of generating a two-dimensional representation of a hierarchical data structure, as illustrated FIG. 1.
Figure 2B:
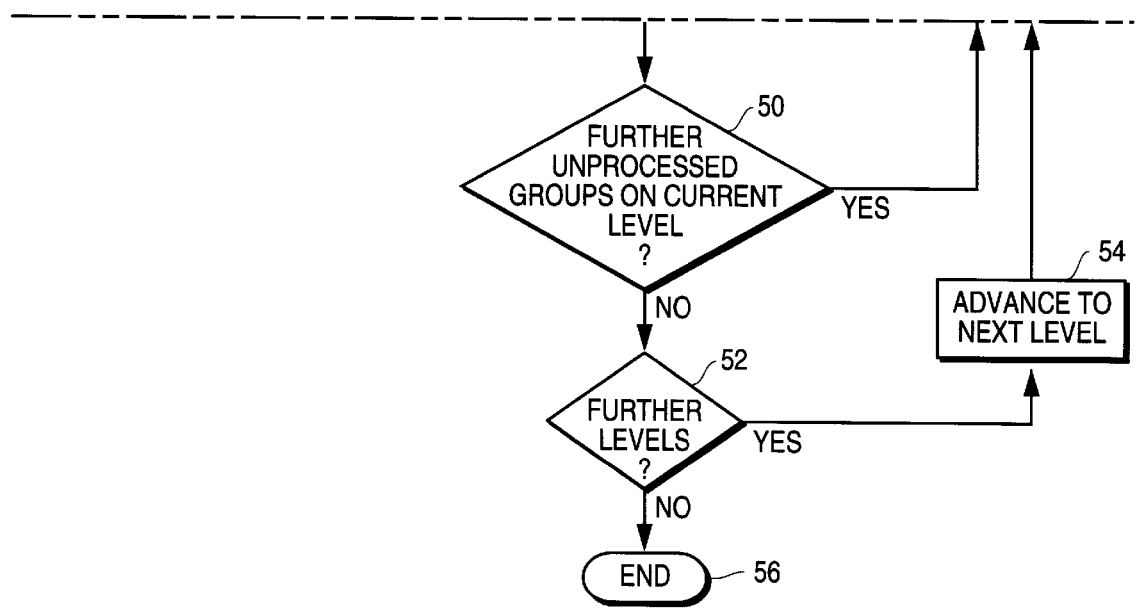

Referring to FIG. 1, there is shown a data structure, in the form of a tree 20. The tree 20 may represent any type of data structure, such as a directory of programs and files on a computer system, Uniform Resource Locators (URLs) within a web site or organizational structure. The tree 20 further comprises a series of nodes which are located within various levels within the tree tin. Specifically, a root node 12a located on a root level 12. The root node 12a constitutes a parent node in respect to nodes 14a and 14b on level 14. Nodes 14a and 14b are regarded as being children of the node 12a. The tree 20 further includes levels 16 and 18, on which are located a number of nodes as indicated. The present invention proposes a method of generating a two-dimensional data representation, such as the tree 20. The hierarchical relationships between the nodes of the data structure, as represented in tree 20, are readily apparent. One embodiment of a method 30 of generating the tree 20, utilizing a non-graphical hierarchical data structure as input, is shown in FIG. 2. The method 30 commences at step 32, whereafter the root node 12a is centered on level 12, and the level below the root level 12 (i.e., level 14) is identified at step 34. At step 36, a node gap and a group gap are specified for the current level.

For the purposes of theisspecification, nodes which share a common parent (i.e., the children nodes of a parent node) shall be defined as a "group" of nodes. For example, nodes 14a and 14b comprise a group, as do nodes 16a, 16b and 16c. The node gap specifies a predetermined spacing (or distance) between nodes within a group, and the group gap specifies the spacing between adjacent groups of nodes. Both the node and group gaps may be defined in terms of pixels or any other convenient measure.

For the purposes of this specification, the term "block" shall be defined to comprise a set of adjacent groups of nodes.

The method 30 then proceeds to step 38, where the left-most group that has not been processed, and that is on the current level, is identified and incorporated into a current block. Referring to the tree 20, and assuming that level 16 is the current level, the group comprising the nodes 16a, 16b, and 16c would thus be firstly identified as the left-most, unprocessed group of nodes. At step 40, the X coordinates of the current block are set so that the current block of groups is centered between the left-most parent and the right-most parent of the nodes included in the current block, and so that the gaps between nodes in the same group are equal to the node gap and the gaps between adjacent groups are equal to the group gap. Again, taking level 16 of tree 20 as an example, the nodes 16a, 16b and 16c are thus centered under node 14a and are spaced apart from each other by a node gap 22 set for level 16. At decision box 42, a determination is made as to whether any nodes of the current block overlap with nodes of the block to the left of the current block. For example, it may occur that, after having performed step 40 with respect to the block comprising nodes 16d and 16e, that the nodes 16d and 16c overlap, or are at least closer to each other than the specified group gap. Accordingly, for the purposes of this specification, the term "overlap" should be taken to require that nodes of different groups are at least closer to each other than the specified group gap. If such an overlap is detected, the method proceeds to step 44, wherein the block to the left of the current block, and the current block, are merged to create a new current block. Step 40 is then repeated with respect to this newly defined current block. Alternatively, should it be determined at decision box 42 that there is no overlap, a method proceeds to decision box 46, where a determination is made as to whether the horizontal width of the blocks on the current level is too large with respect to the previous level by some metric. If so, the node gap and/or the group gap are decreased at step 48, all groups of the current level are registered as "unprocessed" and the method loops back to step 36. If not, the method proceeds to decision box 50. If there are further unprocessed groups on the current level, the method loops back to step 38. If all groups on the level have been processed, the method 30 proceeds to decision box 52, where a determination is made as to whether any further levels require processing. If so, the method advances to the next level at step 54, and then loops back to step 36. If all levels have been processed, the method ends at step 56.

Accordingly, by performing the above-described method 30, the tree 20 can be generated.

The two-dimensional tree 20 shown in FIG. 1, while providing an adequate representation, may be optimized by transforming the tree 20 into a three-dimensional representation utilizing a method according to the present invention. A three-dimensional representation is believed to provide a more intuitive representation of the hierarchical data structure, and also to allow a greater number of nodes to be displayed within a predetermined display area defined by a display device, such as a Cathode Ray Tube (CRT) or a Liquid Crystal Display (LCD). A method 70 of transforming a two-dimensional tree, such as the tree 20, into a three-dimensional representation, is illustrated in the flow charts of FIGS. 4a and 4b. The method 70 is described with reference to the grids 60 and 62 shown in FIG. 3, which provide an exemplary visual illustration of the steps comprising the method 70. Each of the grids 60 and 62 is defined by three axes, namely a X axis 64, a Y axis 66 and a Z axis 68. Referring now to FIG. 4a, the method 70 commences at step 72, whereafter, at step 74, a hierarchical data structure (e.g., the tree 20) is inputted into a display-generating device, such as a general purpose microprocessor or a graphics integrated circuit. At step 76, X and Y displacement values are set. The X and Y displacement values determine the distance, and relative offset, between adjacent levels of nodes to be displayed. At step 78, the X and Y coordinates of the root node 12a, and the center of the root level 12, are set to a desired position. Referring to grid 60, the root node 12a is shown as being moved to the right by the allocation of a new X coordinate. At step 80, a "zoom factor" and a slope value are set. Specifically, the zoom factor will determine how large or small the three-dimensional data structure would appear to a viewer, and the slope value determines the angle 69 of the Z axis 68 relative to the X axis 64. In one embodiment, the angle 69 is between 2 and 35 degrees.

At step 82, the level below the root level (i.e., level 14) is selected as the current level. The center of the current level is then shifted to the left or right, and up or down, relative to the center of the preceding level, according to the X and Y displacement values, at step 84. In the grid 60 illustrated in FIG. 3, the center of the level 14 is "shifted" to the left relative to the center of the level 12 by shifting the root node 12a to the right as indicated. At step 86, the X coordinate of each node is calculated according to the zoom factor set in step 80 and relative to the X coordinate of the center of the current level. Specifically, for each node on the current level, the X coordinate is multiplied by the relevant zoom factor and added to the displacement of the X coordinate of the center of the current level from the center of the root level. At step 88, a Z line 88a, which is parallel to the Z axis 68, is defined as passing through the center of the current level at 88c, as illustrated in grid 60 of FIG. 3.

The method 70 then progresses to step 90, where a Y coordinate for each node is recalculated as lying on the Z line 88a at the X coordinate of the relevant node. For example, referring to grid 60 of FIG. 3, the Y coordinates for the nodes 14a and 14b are calculated at points 90a and 90b on the Z line 88a.

Figure 3:
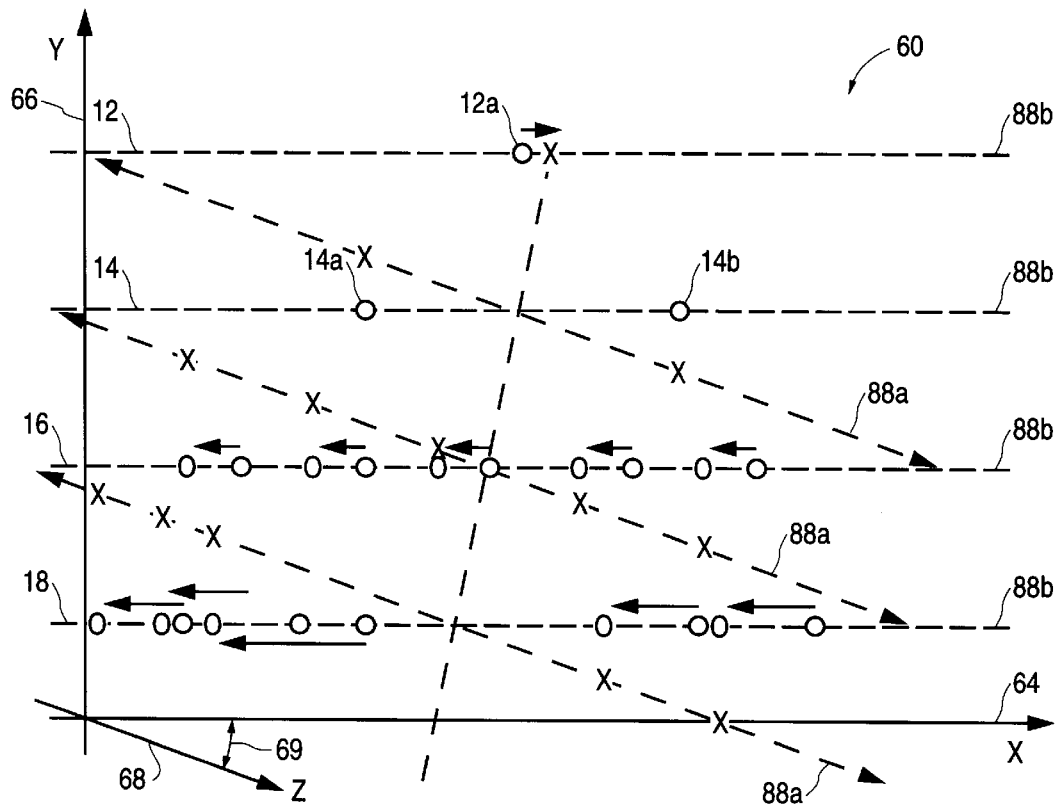
FIG. 3 illustrates the transformation of a two-dimensional representation of a hierarchical data structure into a corresponding three-dimensional representation.
Figure 3:
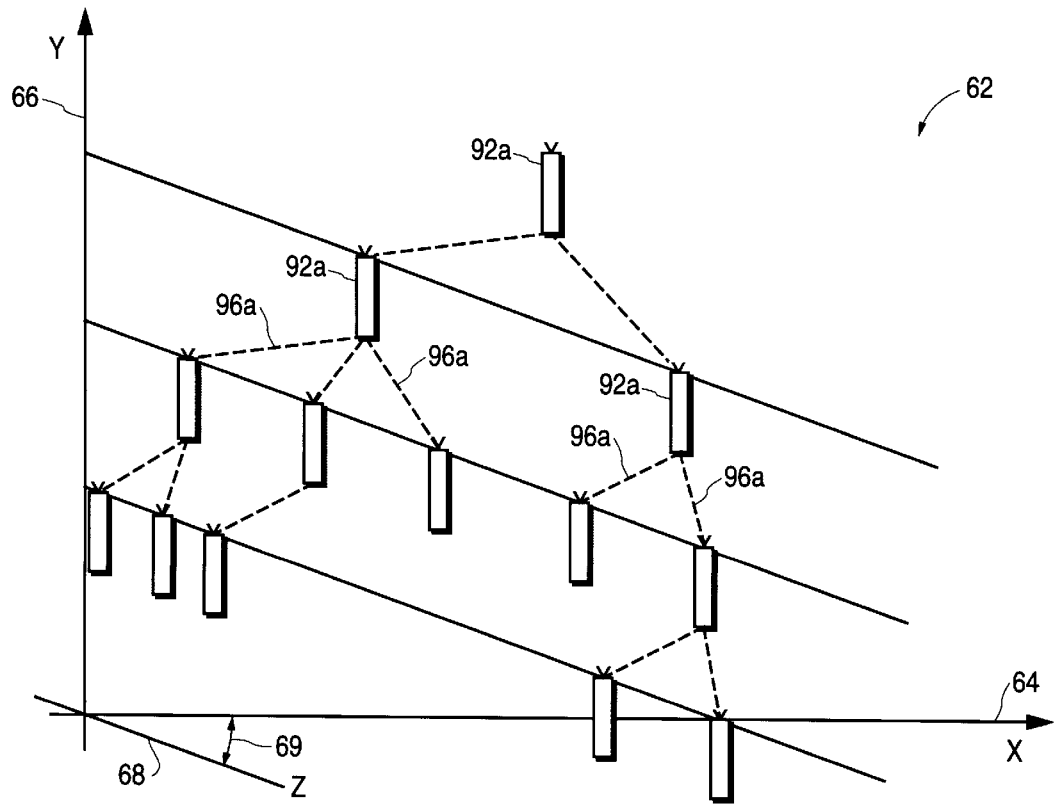
Figure 4A:
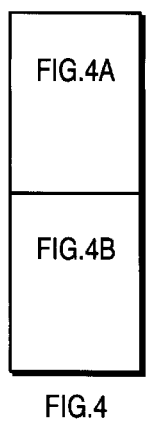
FIGS. 4a–4b illustrate a flow chart showing a method, according to one embodiment of the present invention, of transforming a two-dimensional hierarchical data representation into a corresponding three-dimensional data representation, as illustrated in FIG. 3.
Figure 4A:
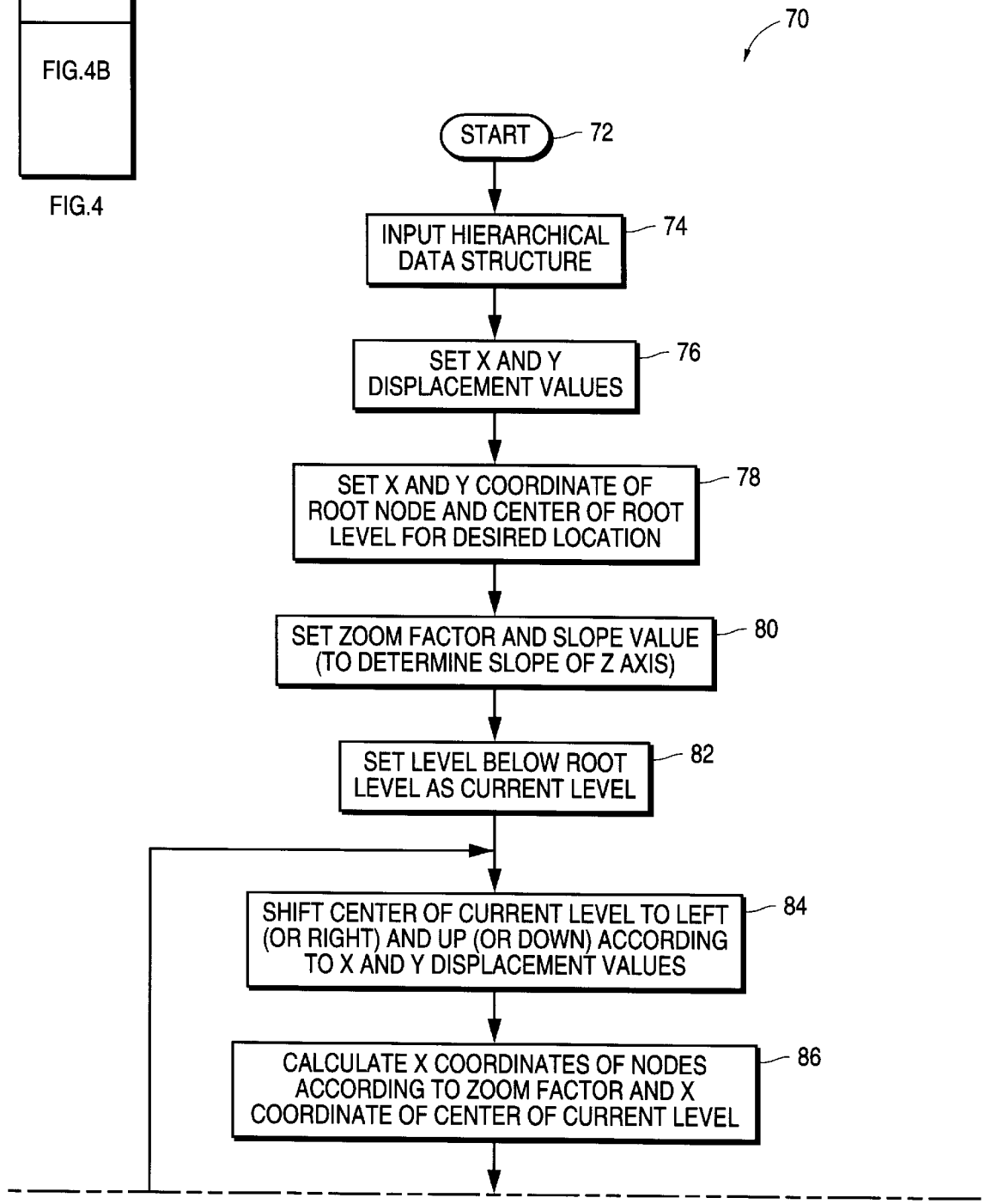
Figure 4B:
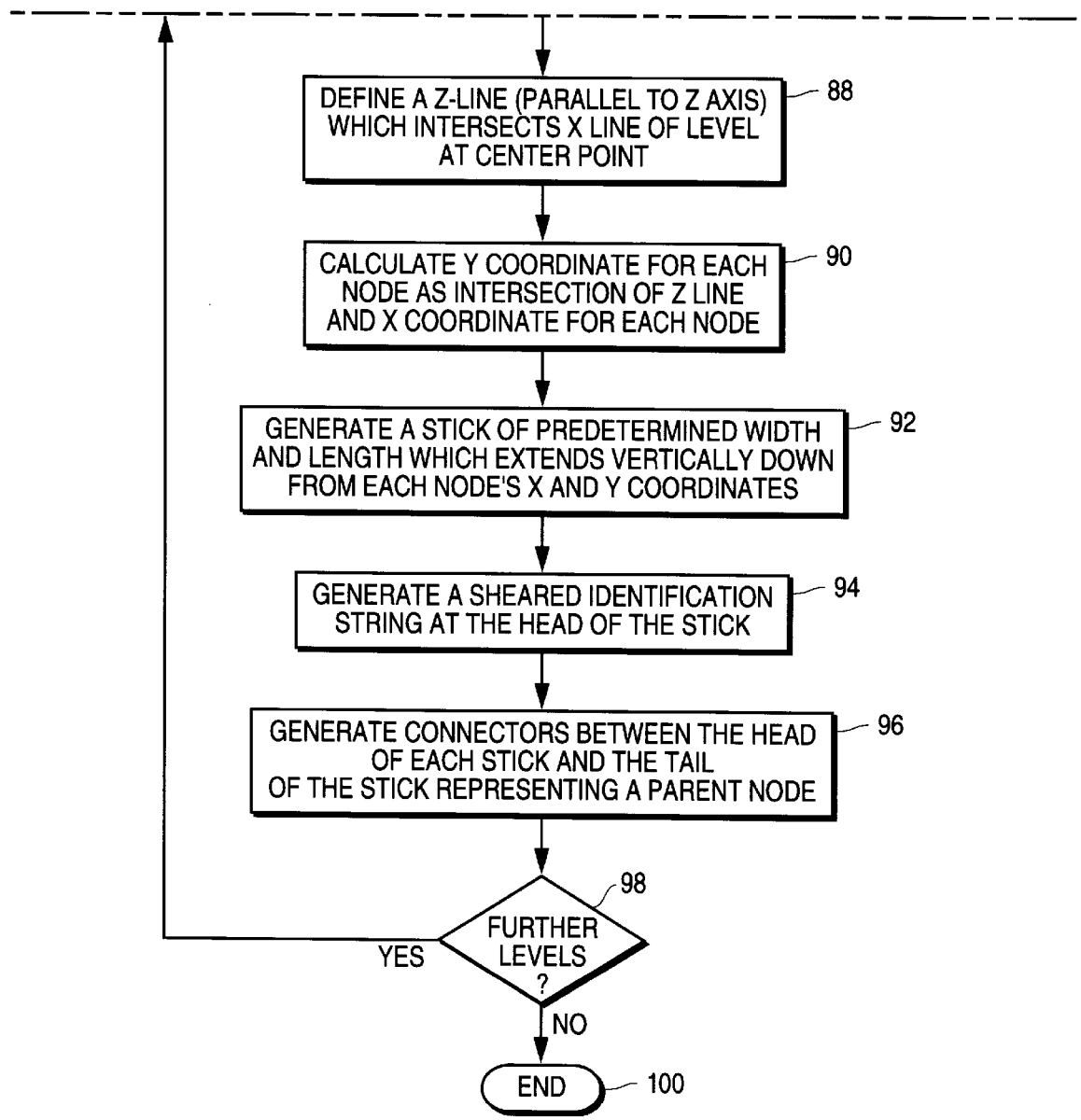

Referring now to FIG. 4b, at step 92, a node representation in the form of a stick 92a, is generated on a display unit, such as a CRT or LCD, extending vertically down from each node's X and Y coordinates. This is illustrated in grid 62 of FIG. 3. The method 70 then proceeds to step 94, wherein a sheared identification string is generated and displayed at the head of each stick 92a. For example, the identification string may be the name of a folder or sub-directory. At step 96, connectors 96a are generated between the top of each stick in the current level, and the bottom of the stick representing a parent in the immediately preceding level. At decision box 98, a determination is made as to whether any further levels exist within the hierarchical data structure. If so, the method loops back to step 84. If not, the method terminates at step 100.

Accordingly, by performing the above-described method 70 with respect to each level of a hierarchical data structure, a three-dimensional representation of the hierarchical data structure, such as that illustrated in grid 62 of FIG. 3, is generated.

Figure 5A:
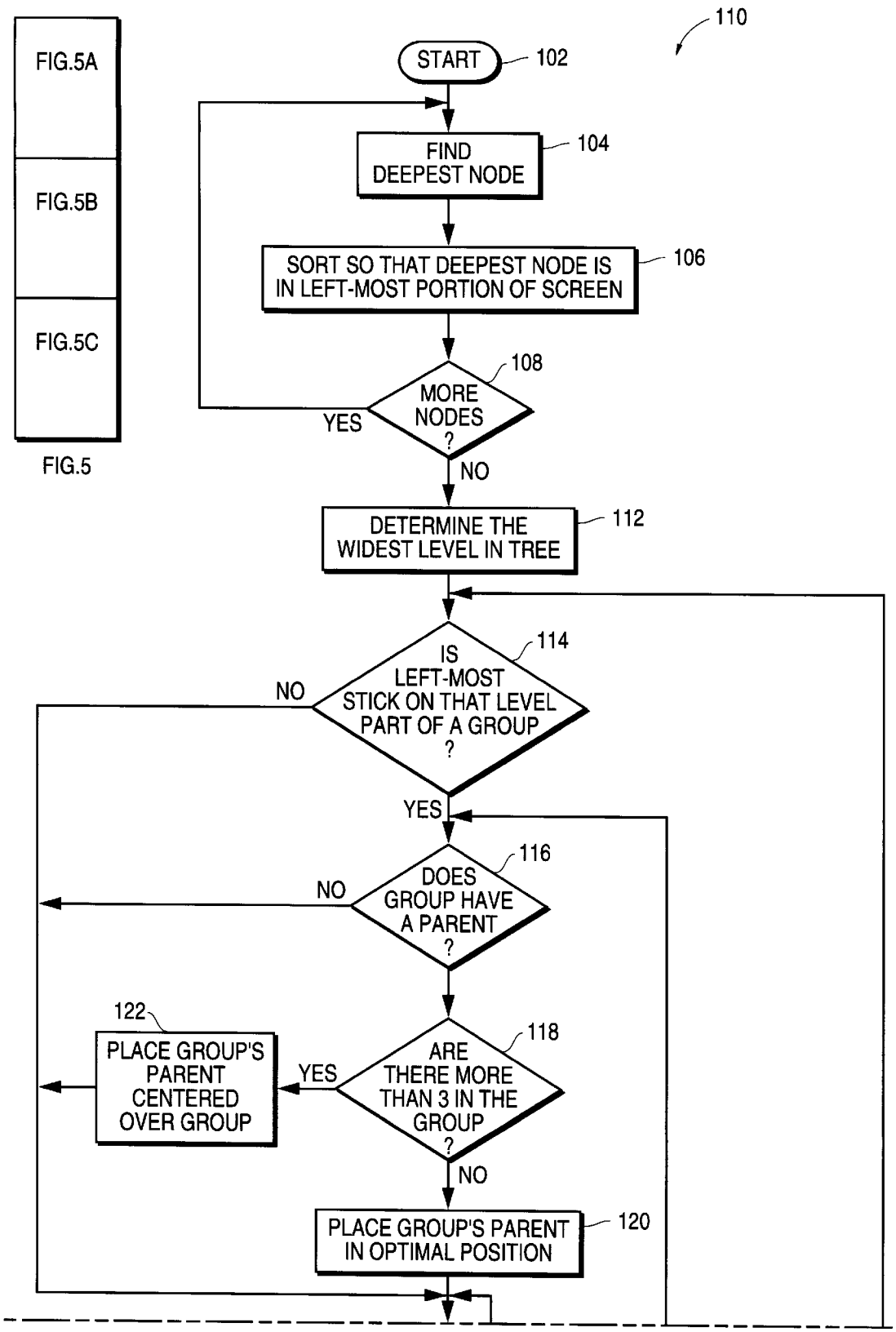
FIGS. 5a–5c illustrated a method, according to a further embodiment of the present invention, of generating a two-dimensional hierarchical data representation.
Figure 5B:
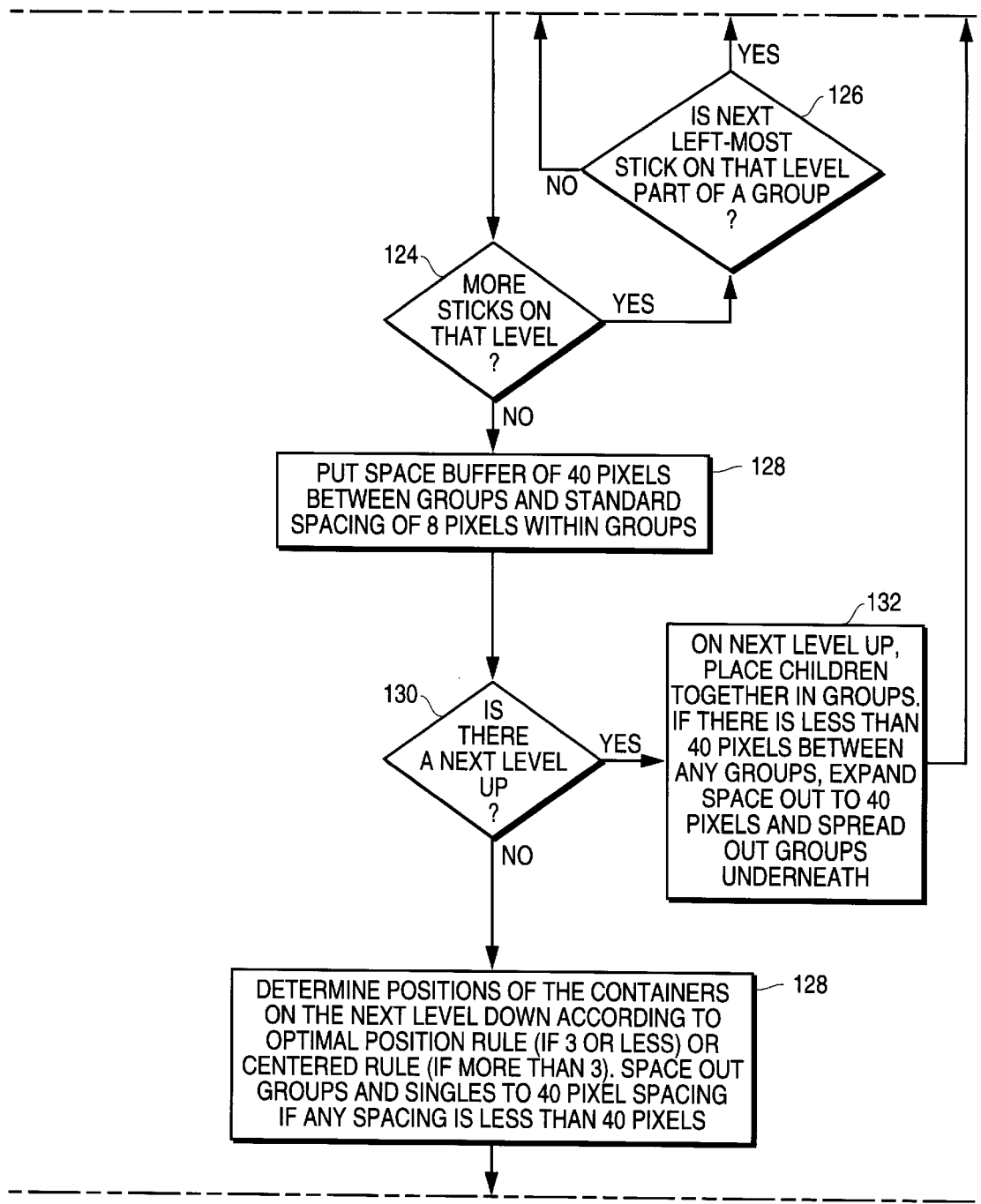
Figure 5C:
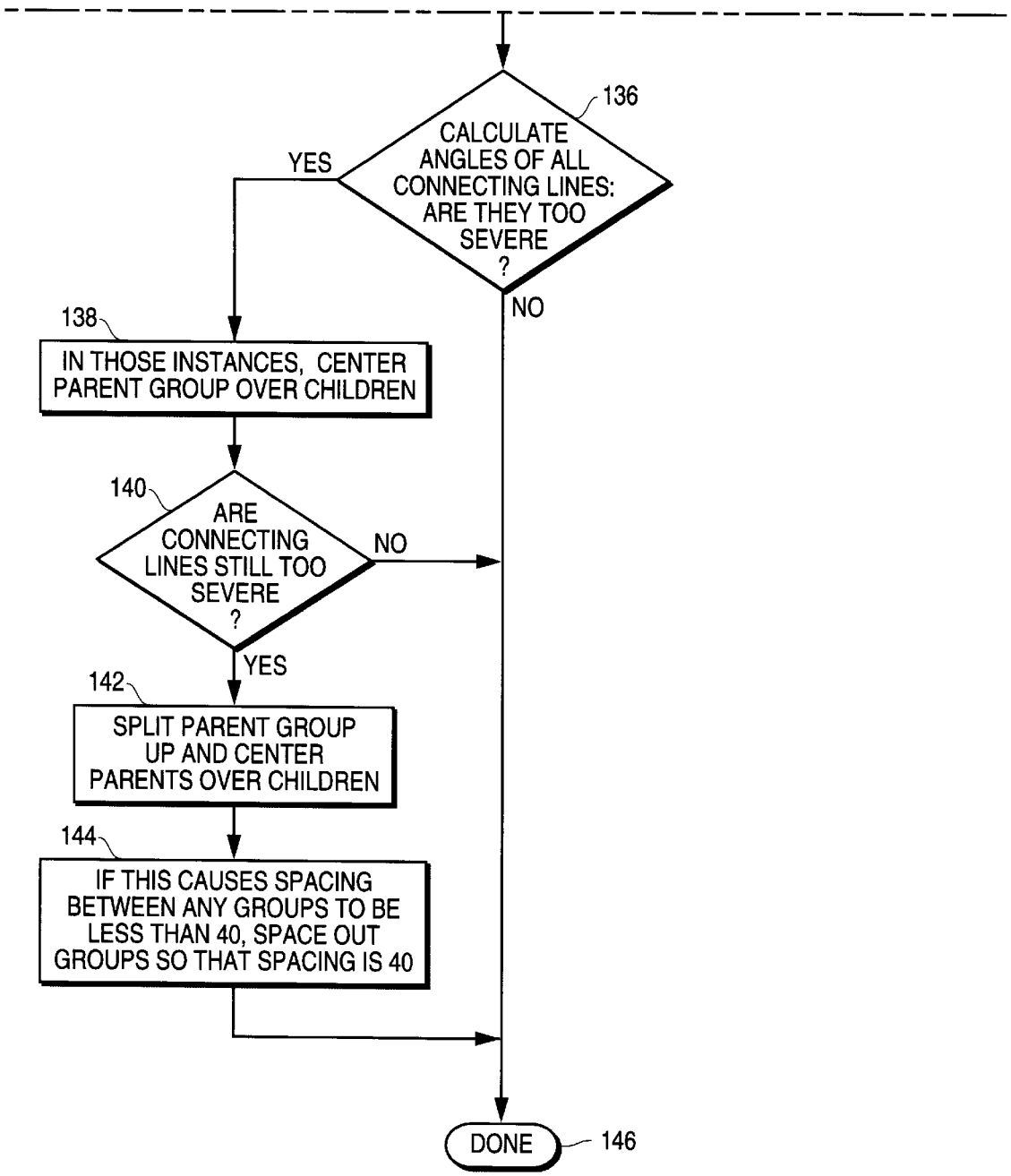

FIGS. 5a and 5b show a flow chart illustrating an alternative method 110, according to the present invention and comprising the steps 102–146 of generating a two-dimensional hierarchical data tree suitable for transformation into a three-dimensional representation.

Figure 6:
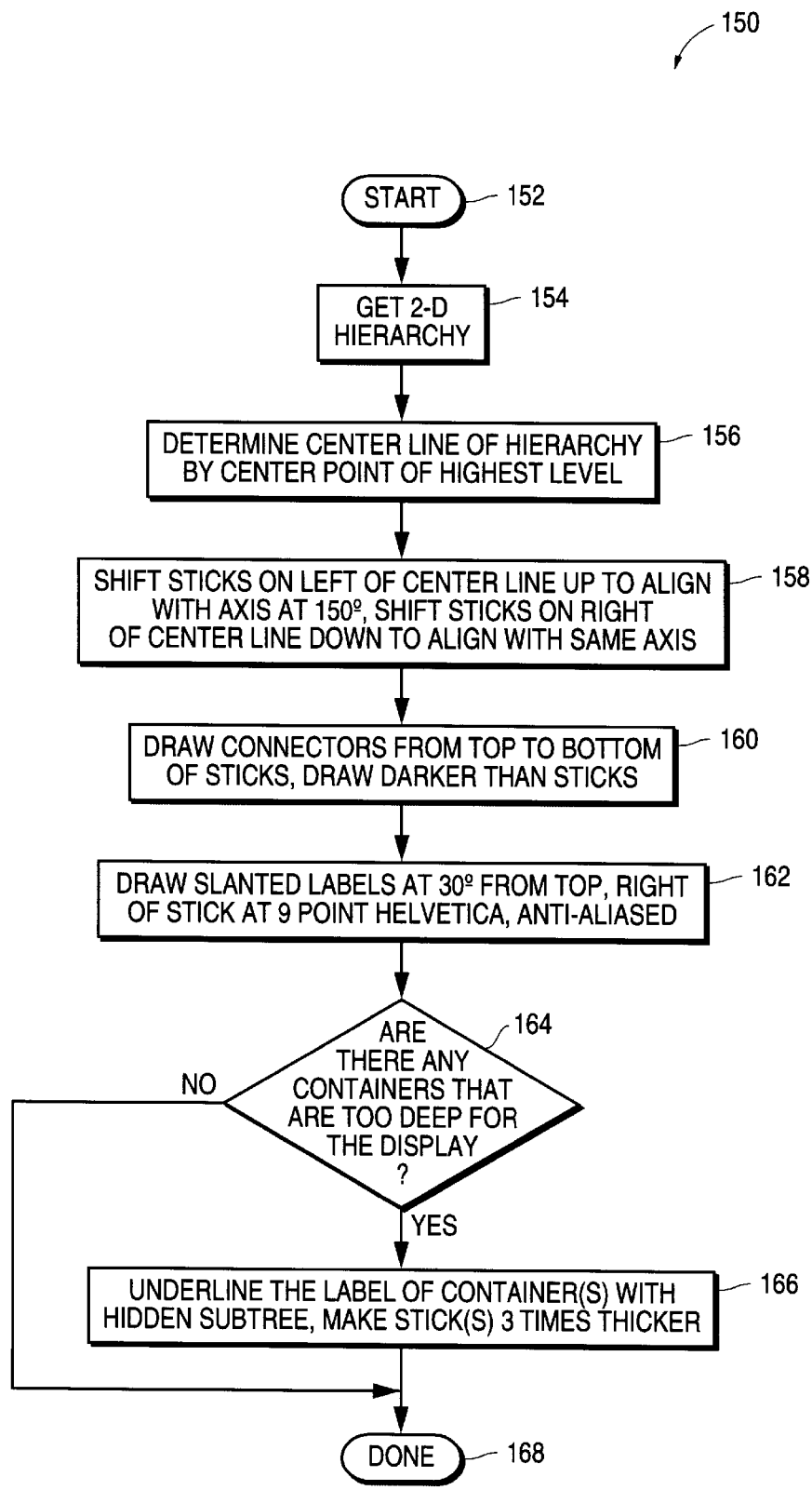
FIG. 6 is a flow chart illustrating a method, according to a further embodiment of the present invention, of transforming a two-dimensional hierarchical data representation into a three-dimensional representation.

FIG. 6 shows an alternative method 150, according to the present invention, of transforming a two-dimensional hierarchical data structure into a three-dimensional representation. The method 150 requires determining a "Y" line (i.e., the center line) of the hierarchy at the center point of the widest level. Specifically, the center line of the widest level is determined because this will act as a pivot point about which the layout tree is shifted. At step 158, the nodes on the left side of this center line are shifted upwards, and the nodes of the right side of this center shifted downwards, to align along a Z axis (i.e., a 150° axis), to thereby support an isometric view layout. At step 160, connectors are drawn from the top of the sticks of the current level to the bottom of a respective parent stick of the preceding level. At step 162, slant labels (i.e., sheared identifier strings) are drawn at an angle of 30° relative to the X axis. At decision box 164, a determination is made as to whether there are any parent-child node sequences that are too deep for display within a predetermined grid. If so, the label of the node above the hidden sequence nodes is underlined, and the width of the stick representing this node is increased three fold, at step 166. Alternatively, if there are no node sequences too deep for display, the method terminates at step 168.

Figure 7A:
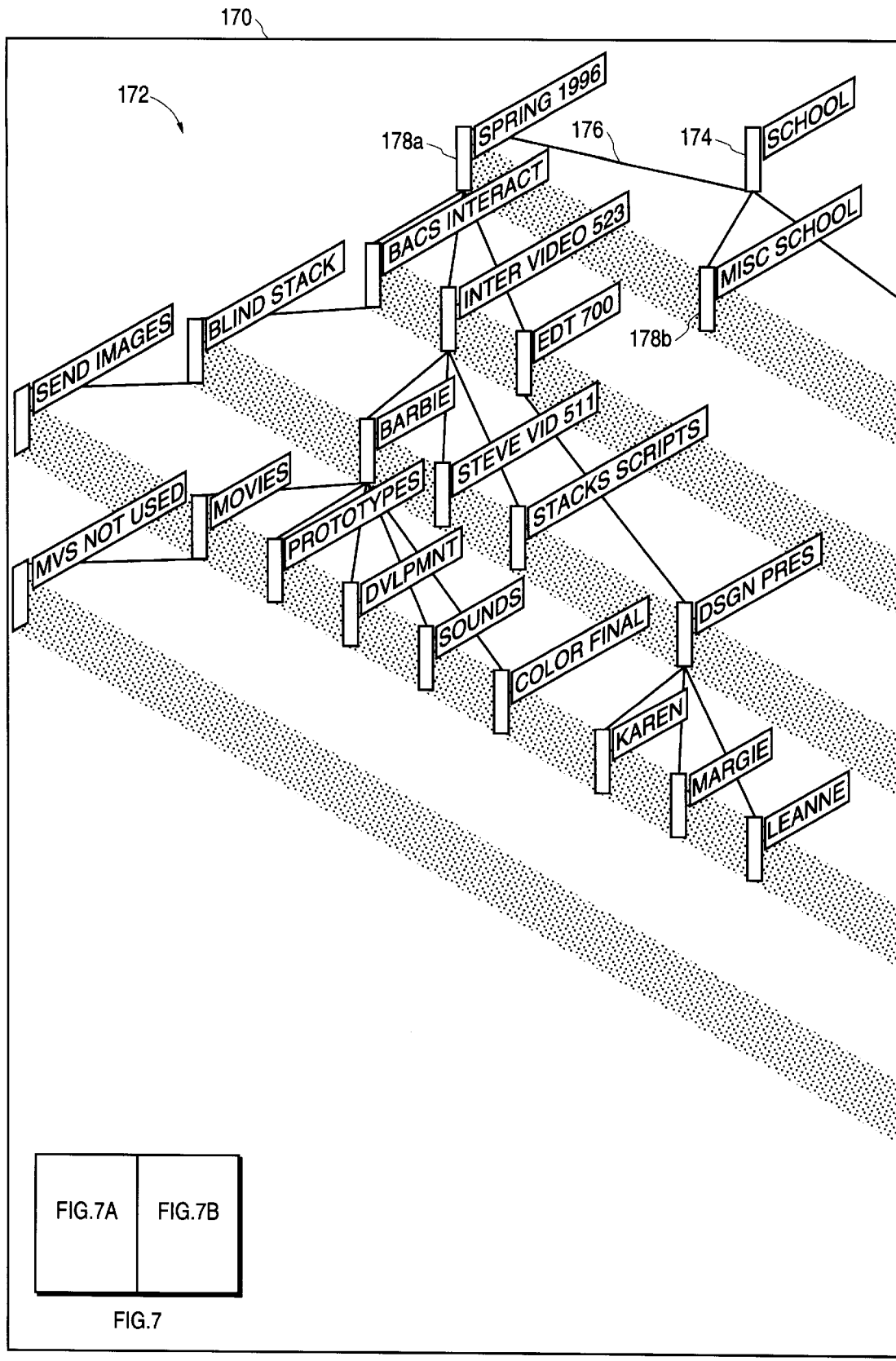
FIG. 7 illustrates a three-dimensional representation of a hierarchical data structure generated according to the teachings of the present invention.
Figure 7B:
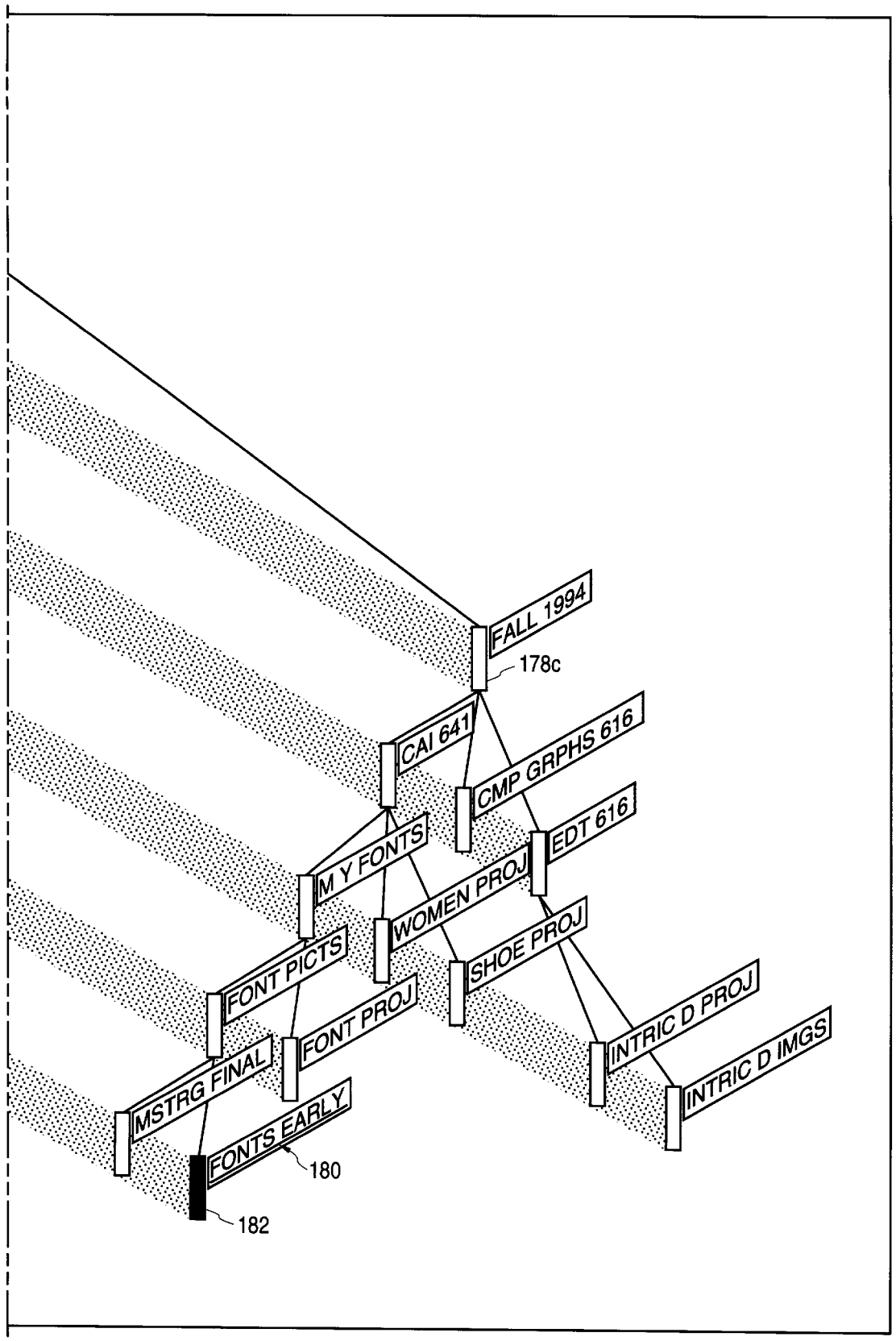

FIG. 7 shows a display screen 170 of a display unit such as a CRT or LCD, on which is displayed a three-dimensional representation 172 of a hierarchical data structure, having a root node 174. Three-dimensional representations, such as the representation 172, may be generated using any one, or combination of, the above described methods. The representation 172 also includes a number of sticks 178, each of which is connected to a parent node 174 via a respective connector 176. It will also be noted that an identifier string 180 of the stick 182 is underlined, and that the stick 182 itself is thickened, to represent that the stick 182 includes deeper, hidden hierarchies.

NAVIGATING WITHIN THE THREE-DIMENSIONAL REPRESENTATION

Figure 8A:
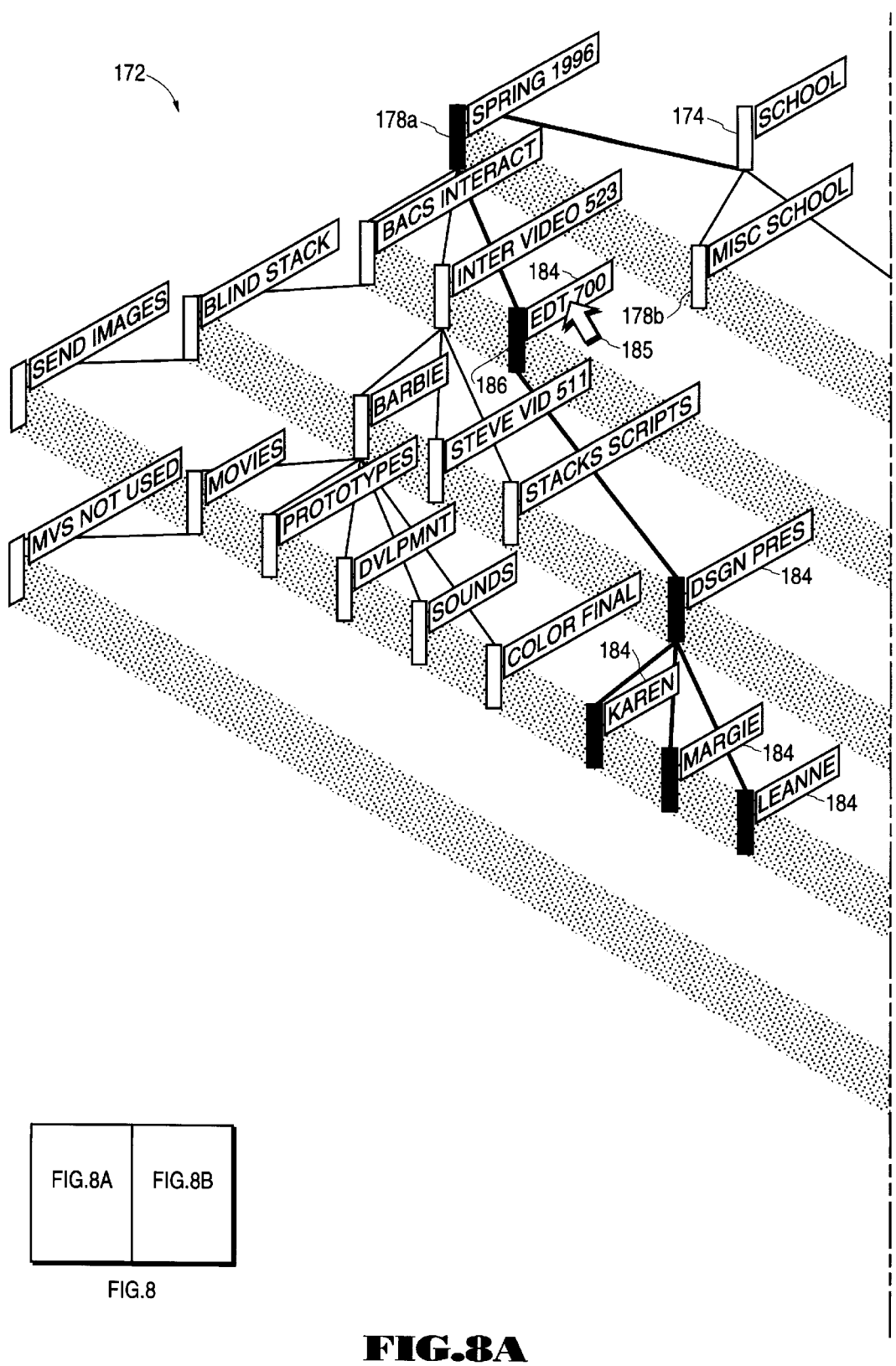
FIG. 8 illustrates the highlighting of a sub-tree of the hierarchical data representation, shown in FIG. 7, in response to a user input.
Figure 8B:
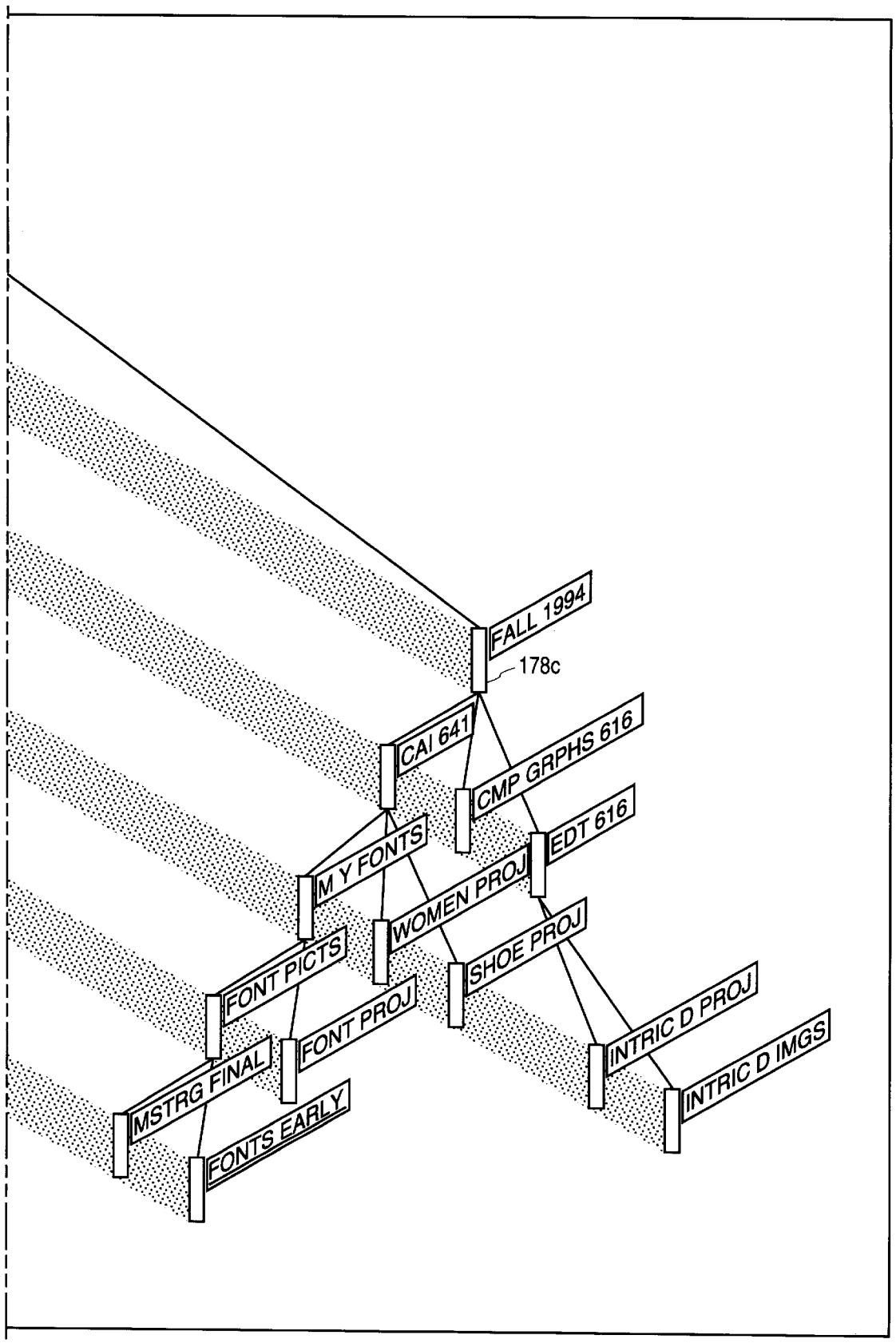
Figure 9:
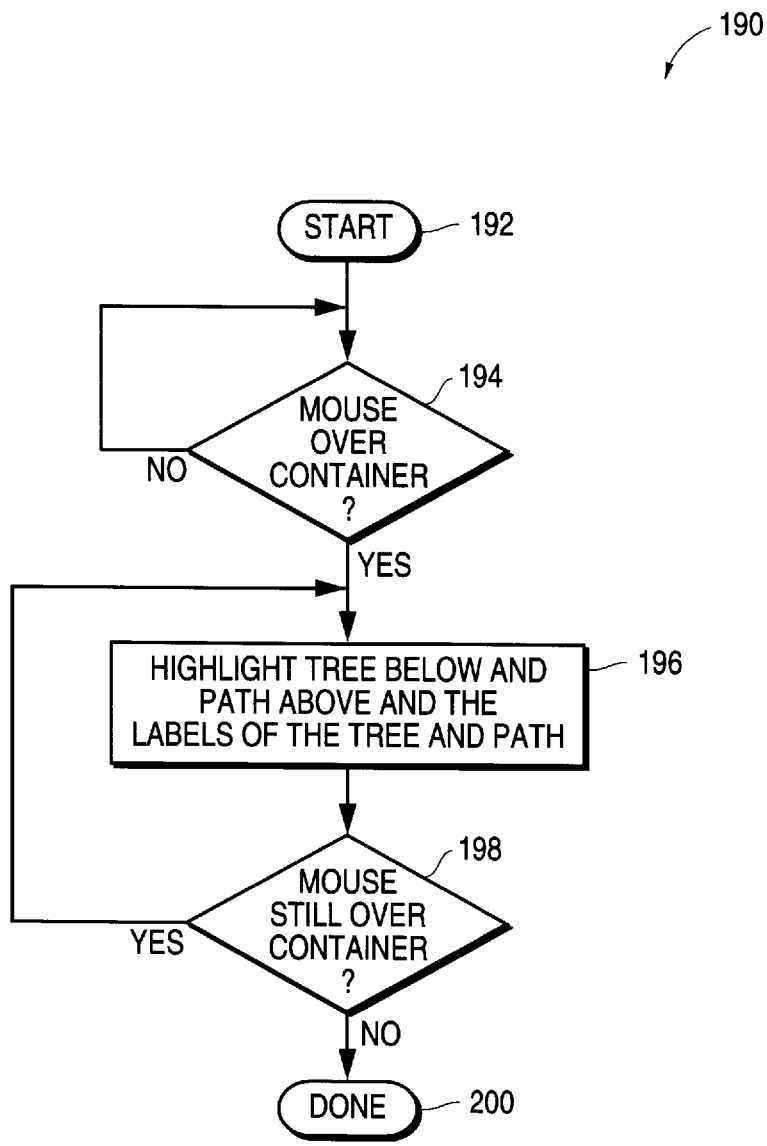
FIG. 9 is a flow chart illustrating a method, according to one embodiment of the present, of generating the highlighted sub-tree shown in FIG. 8.

FIGS. 8 and 9 illustrate the highlighting of a node path (or branch) in response to the movement of a cursor by a user over a node representation in the three-dimensional hierarchical representation 172. Referring specifically to the flow chart on FIG. 9, a method 190, accordingly to one embodiment of the present invention, of highlighting a node path is illustrated. The method commences at step 92, whereafter a determination is made a decision box 194 whether the cursor, moving under the direction of a mouse, is located over a node representation (also termed a "container"). If not, the method 190 loops within a wait state, until the cursor is located over a node representation by the user. The method 190 then proceeds to step 196, and the tree (including all sticks, identifier strings and connectors) below and above the relevant node representation are highlighted as illustrated in FIG. 8. Specifically, FIG. 8 shows a cursor 185 located over the string identifier 184 associated with the stick 186. As illustrated, the tree above and below the stick 186 is highlighted. From step 196, the method 190 proceeds to decision box 198, at which it is determined whether the cursor is still located over the relevant node representation. If so, the method 190 loops back to step 196. If not, the method terminates at step 200.

Referring now to FIGS. 10, 11, and 12a–12b, a method of expanding a branch or sub-tree of a hierarchical data tree is explained. As is most clearly illustrated in FIG. 10, when a sub-tree is expanded, small file icons, in the form of spheres, become visible, below an identifier string and behind a stick which comprise a node representation. Other non-selected branches of the tree are contracted so as to allow more room for the expanded view. Specifically, the surrounding nodes of the non-selected branches slide away, as illustrated at 204, to make room for the selected branch to expand so that the files in this branch are easily viewable.

Figure 10A:
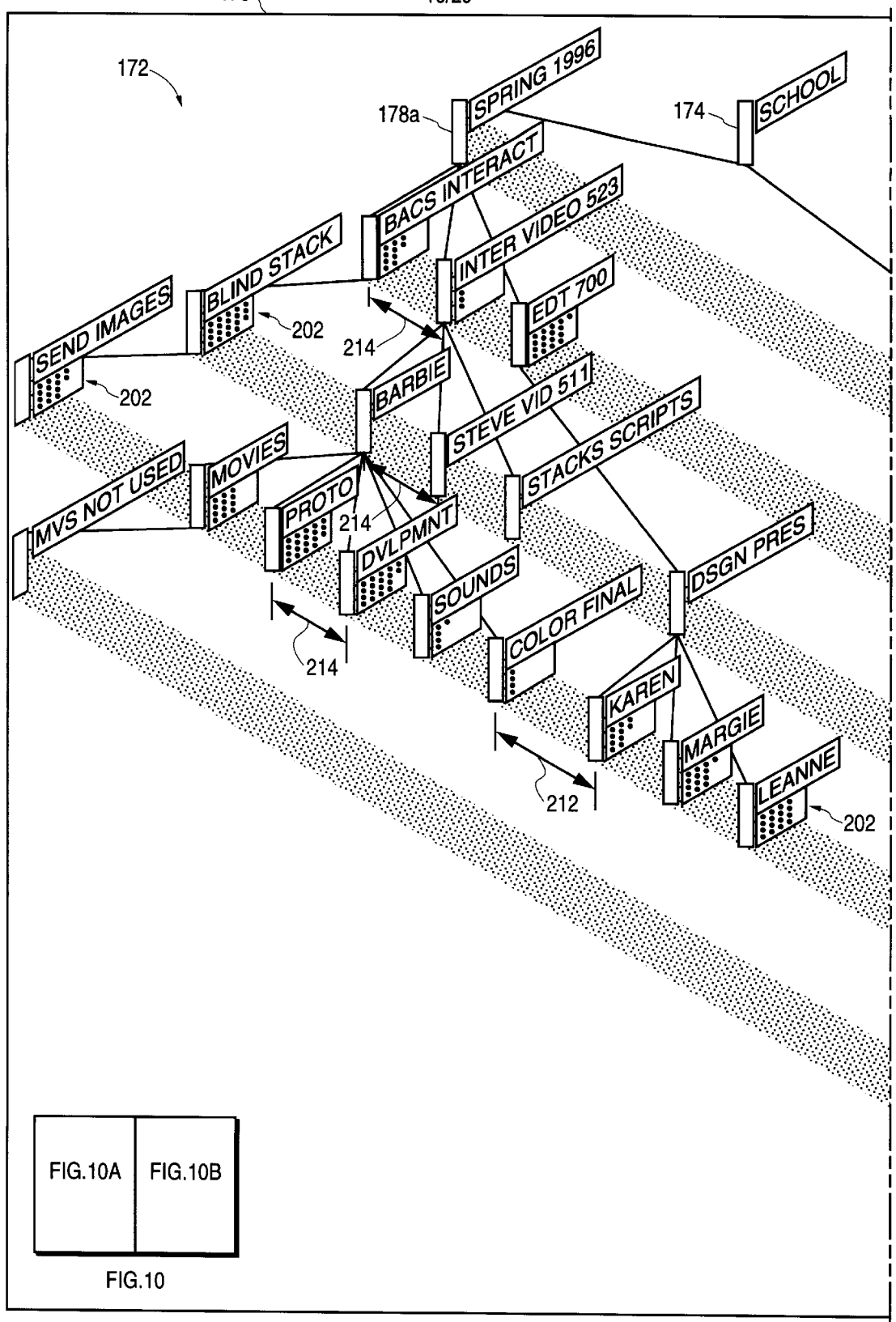
FIGS. 10 and 11 illustrate the expansion of a selected sub-tree of a hierarchical data representation in response to a user input.
Figure 10B:
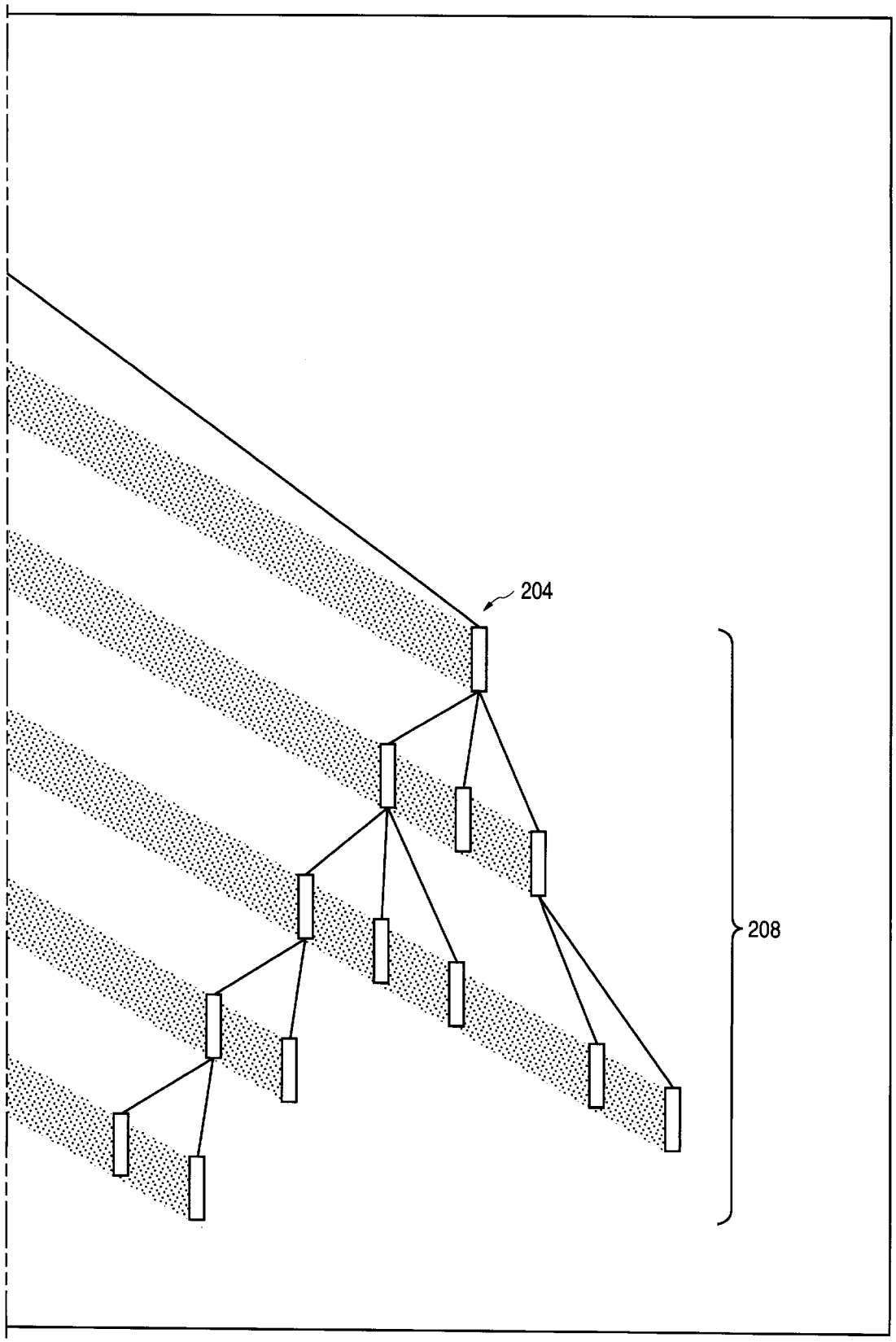
Figure 11A:
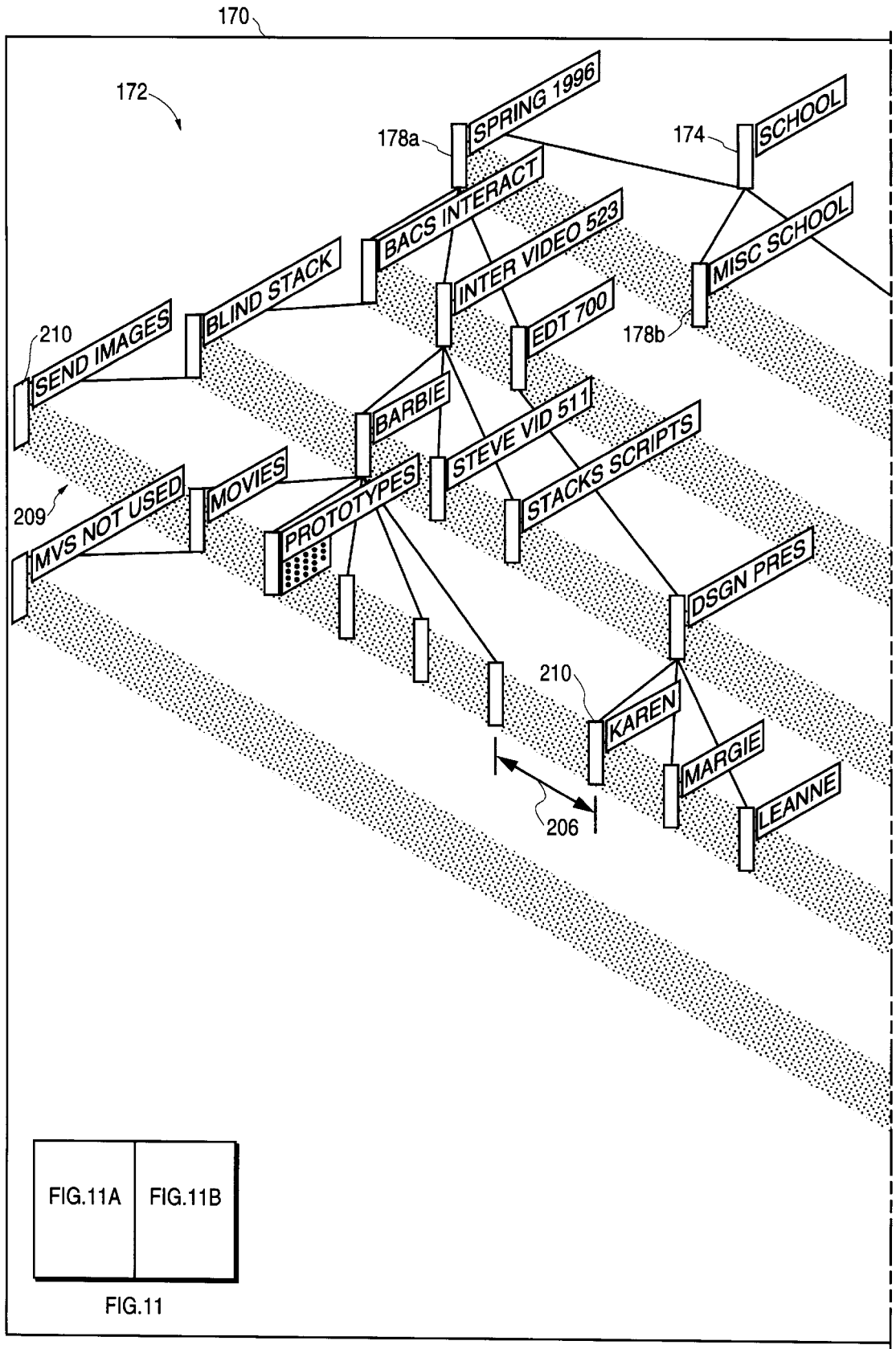
Figure 11B:
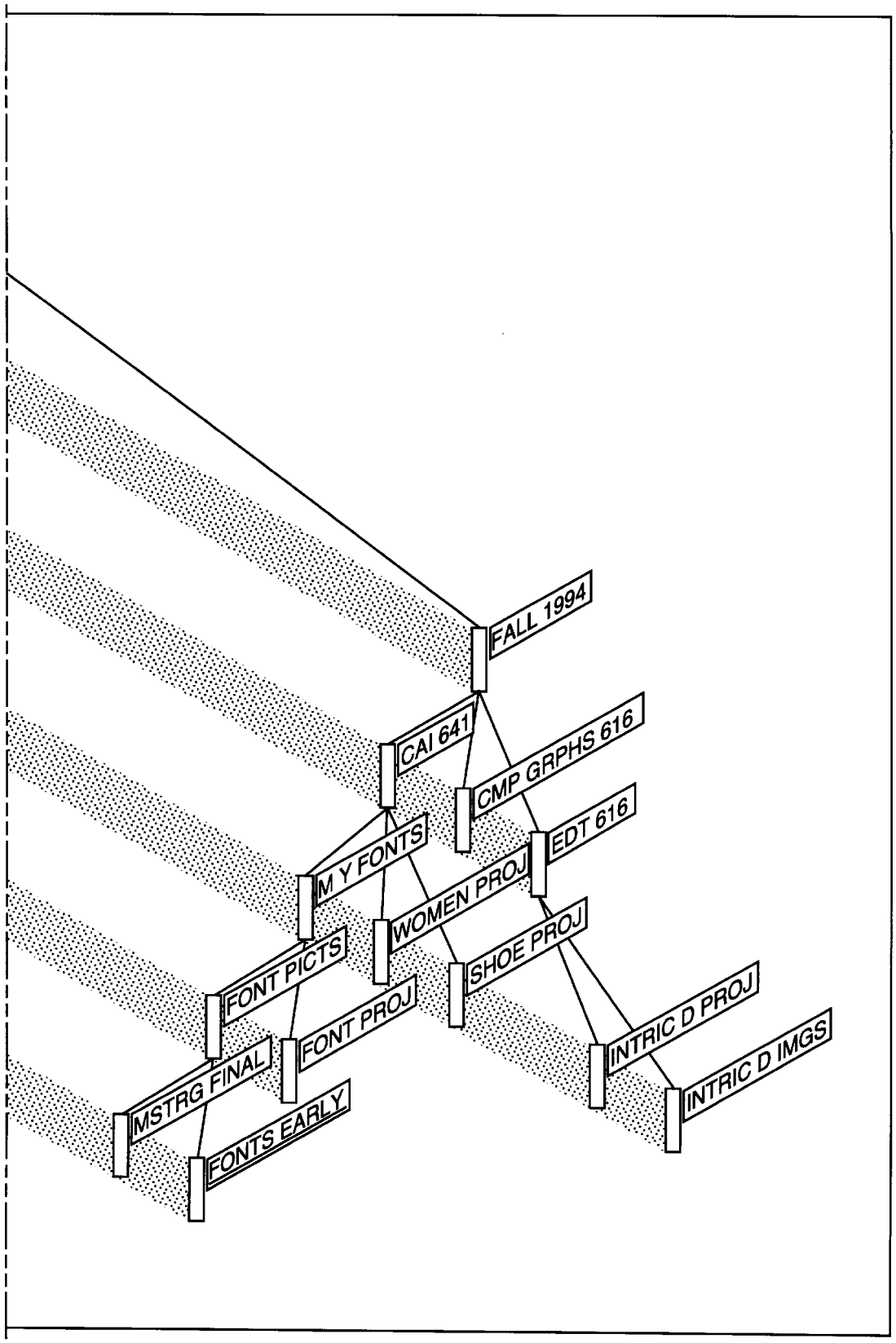
Figure 12A:
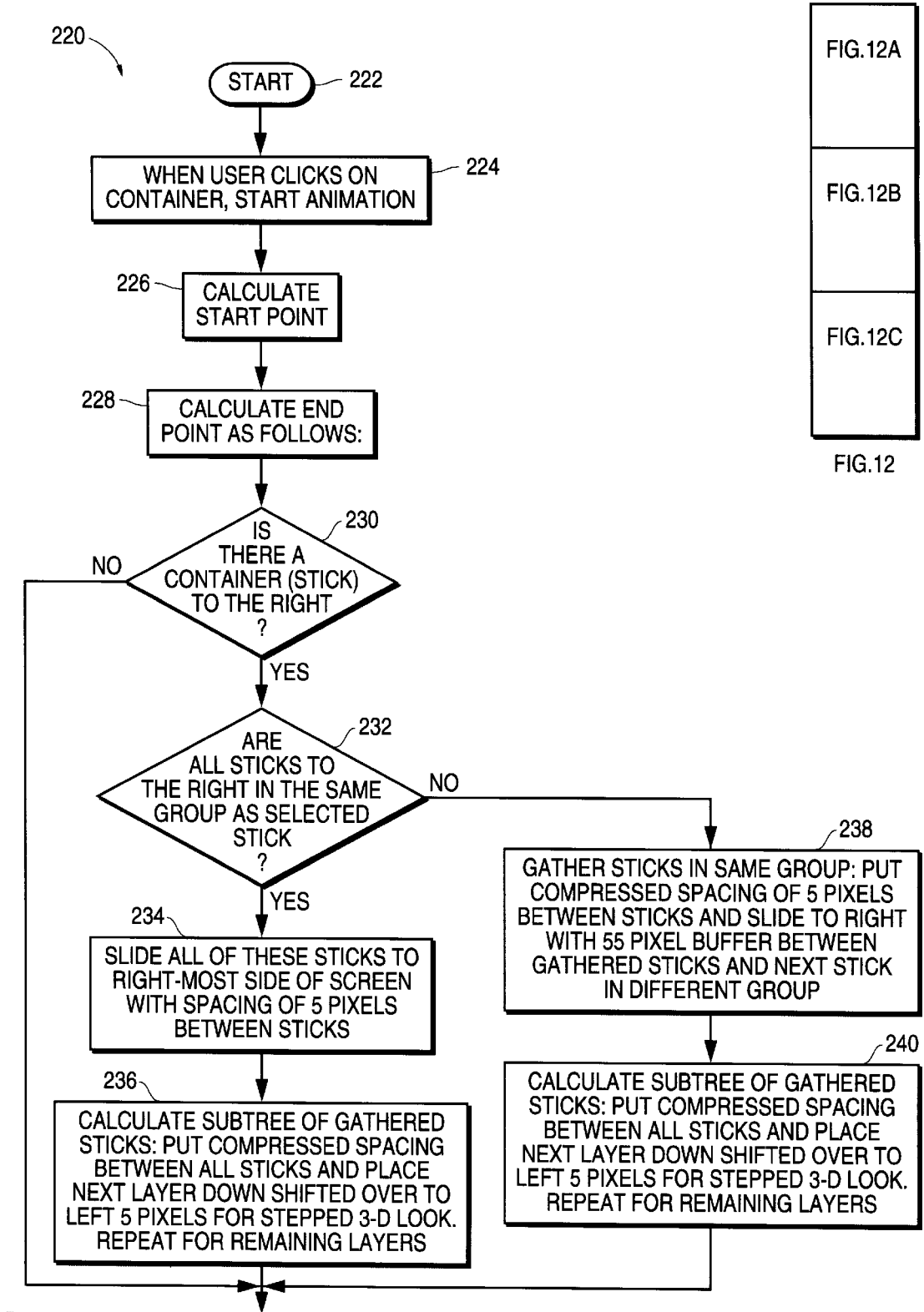
FIGS. 12a–12c show a flow chart illustrating a method, according to one embodiment of the present invention, of expanding a selected sub-tree of a hierarchical data representation, in response to a user input and as illustrated in FIGS. 10 and 11.
Figure 12B:
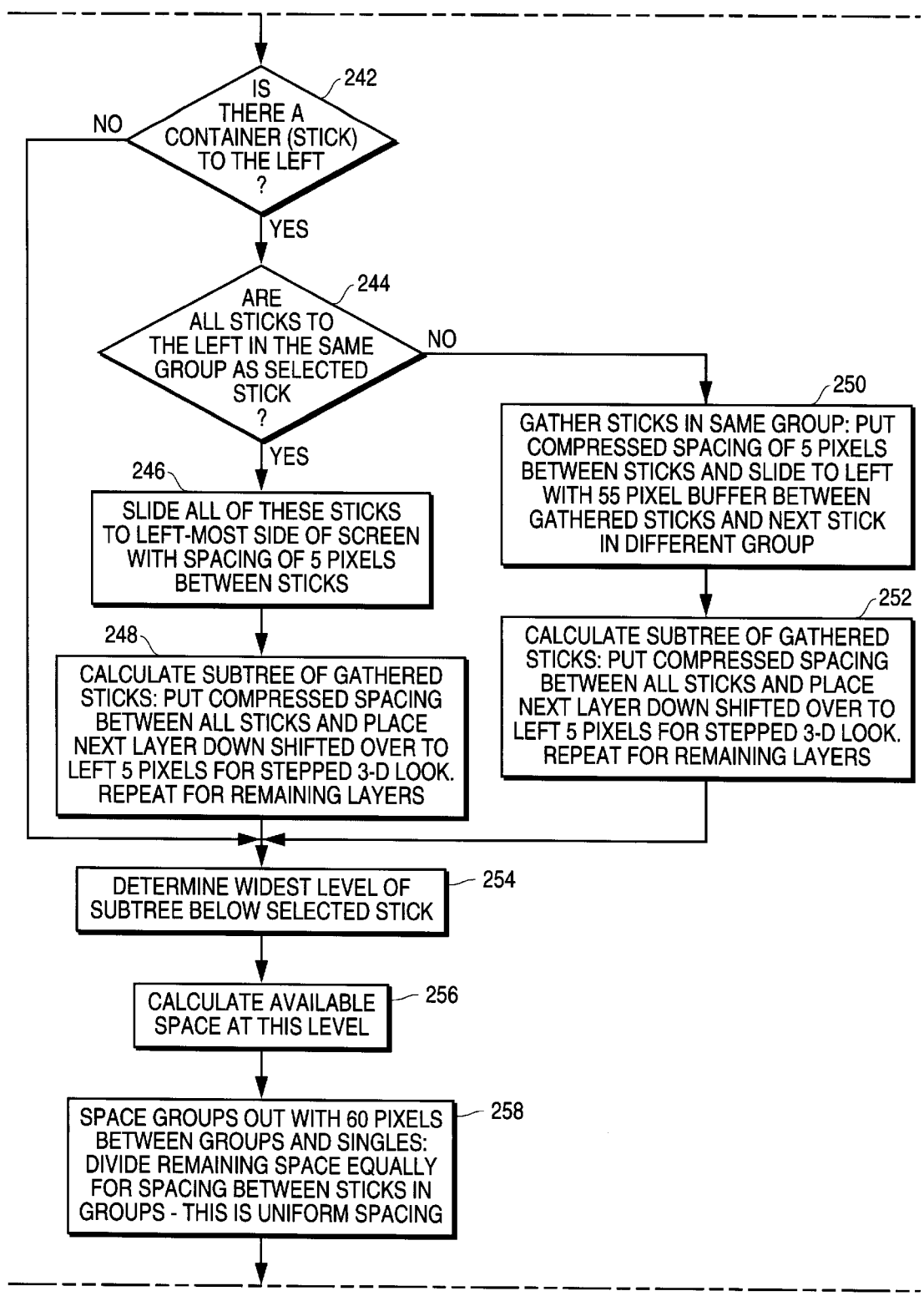
Figure 12C:
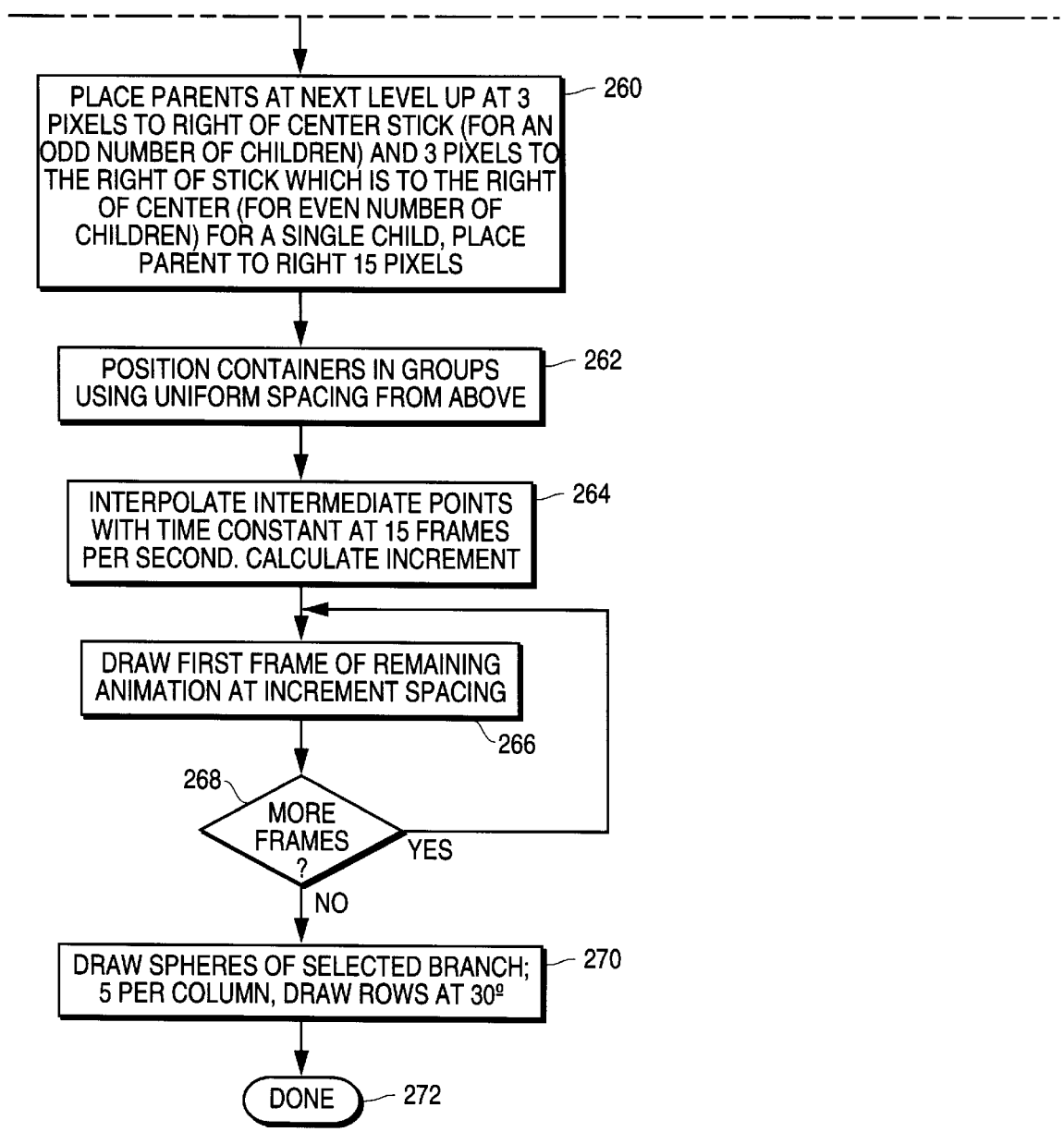

FIGS. 12a–12c illustrate a method 220, according to one embodiment of the present invention, for expanding a branch as illustrated in FIG. 10. The method 220 commences at step 222, and then proceeds to step 224, where a user selects a node representation, and thus commences an animation sequence. At step 226, the start point (i.e., the initial location) of each stick to be animated is calculated. At step 228, the destination or end point for each stick to be animated is calculated according to steps 230–252. Specifically, at step 230, it is determined whether there are any sticks to the right of a node selected by the user. Similarly, at step 242, it is determined whether there are any sticks to the left of a selected node.

If it is determined at step 230 there are sticks to the right of the selected node, it is determined whether these sticks belong to the same group (i.e., have the same parent node) as the selected node. If they do, then these sticks are slid to the right-most side of a grid representing a screen, with a spacing of five pixels between the sticks. If, however, it is determined that sticks belonging to a different group are located to the right of the selected node at step 230, the method the proceeds to step 238. At step 238, sticks from the same group as the selected node are slid into positions adjacent to the next group, with a spacing of 55 pixels, as illustrated at 206 in FIG. 11. From steps 234 and steps 238, the sub-trees of the compressed sticks are drawn in a compressed three-dimensional view, with a placement of parent nodes of their children shifted slightly to the right to maintain the stepped effect, as shown at 208 in FIG. 10.

The methodology described above is then again performed with respect to sticks to the left of the selected node, at steps 244–252. Once the sub-trees to the left and right have been compressed, the method 220 proceeds to step 254, where the widest level of the sub-tree below the selected node is determined. This level is of importance as it determines the spacing of the levels above it in the sub-tree. Specifically, the widest level consumes the most room, and is therefore the least flexible in terms of positioning, and levels above the widest level can be shifted horizontally to maximize the three-dimensional look of the tree. At 256, the space available between boundary sticks of the sub-tree on the level where it is widest, and the edge of the screen on the left and right, are determined. For example, referring to FIG. 11, a sub-tree extending below node 178a is at its widest on the level 209, and the boundary sticks on this level are shown at 210. The placement of the sticks on the widest level 209 is determined by specifying a 55 pixel spacing between groups or between groups and single sticks, as shown at 212 in FIG. 10. The remaining space (i.e., available space minus the space between groups and single sticks) is then divided up evenly between the nodes within the widest row of the selected sub-tree. This spacing becomes uniform spacing, as shown at 214 in FIG. 10, and is used to space all node representations within a group within a selected sub-tree.

At step 260, the placement of sticks on the higher levels is determined by the number of children of the relevant stick. If there is an odd number of children nodes, the node representation of the parent is placed three pixels to the right on the next level up. If there is an even number of children, the node representation of the parent node is placed three pixels to the right of the stick which is to the right of the center line of the relevant group of children. If there is only one child, the node representation of the parent is placed 40 pixels to the right of its child on the next level up. These relationships, once again, reinforce the stepped, three-dimensional look of the hierarchical data representation 172. The placement of the parents in this manner is applied moving up the selected sub-tree, until the selected stick itself is reached. The selected stick is not moved.

At step 264, the animation increment is calculated at 15 frames per second, with a constant time. The animation between the start and end points of each stick is calculated using this animation increment. The frames of the animation are then drawn in sequence, at steps 266 and 268. Once the last frame is drawn, the spheres 202 of the expanded sub-tree are drawn. As is shown in FIG. 10, the spheres 202 are arranged in columns of five spheres and extend backwards from the stick. Accordingly, the number of columns behind a relevant stick is determined by the number of spheres in the container.

Figure 13:
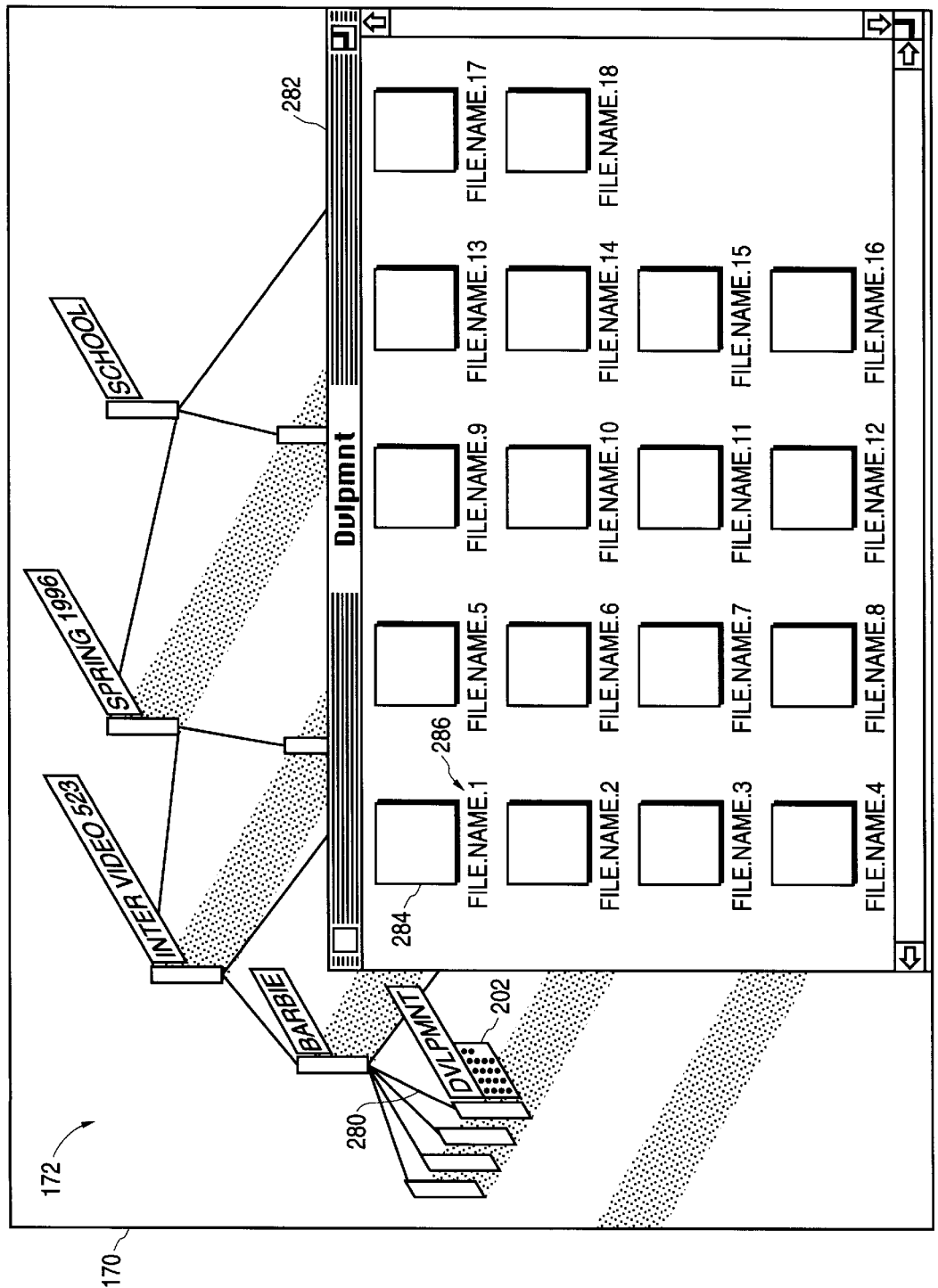
FIG. 13 shows a window, corresponding to a zoomed out file representation, displaying various files which may be contained within a node of a hierarchical data representation.
Figure 14:
FIGS. 14a–14c illustrate a method, according to one embodiment of the invention, of displaying the window, illustrated in FIG. 13, which shows files contained within a node of a hierarchical data structure.
Figure 14A:
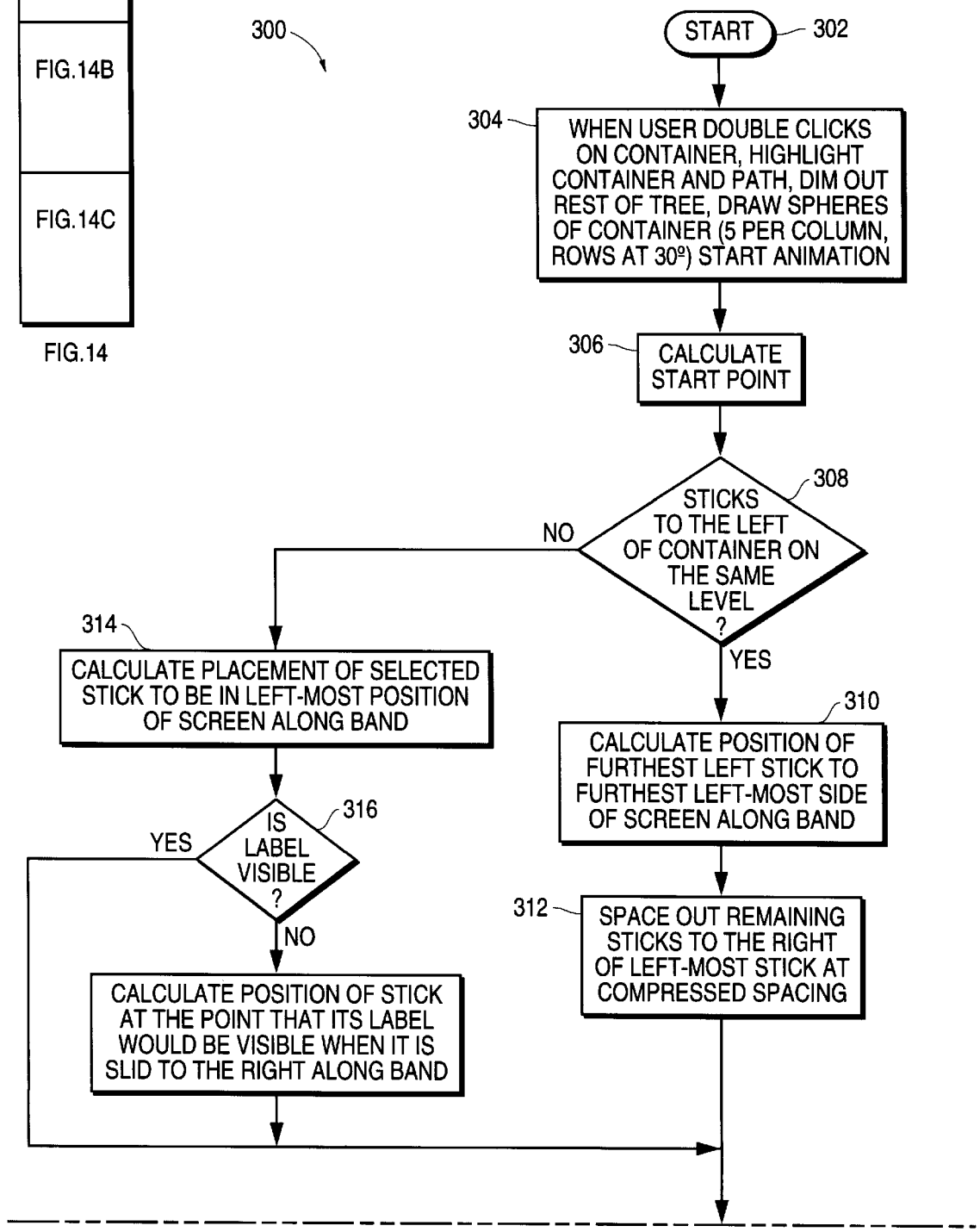
Figure 14B:
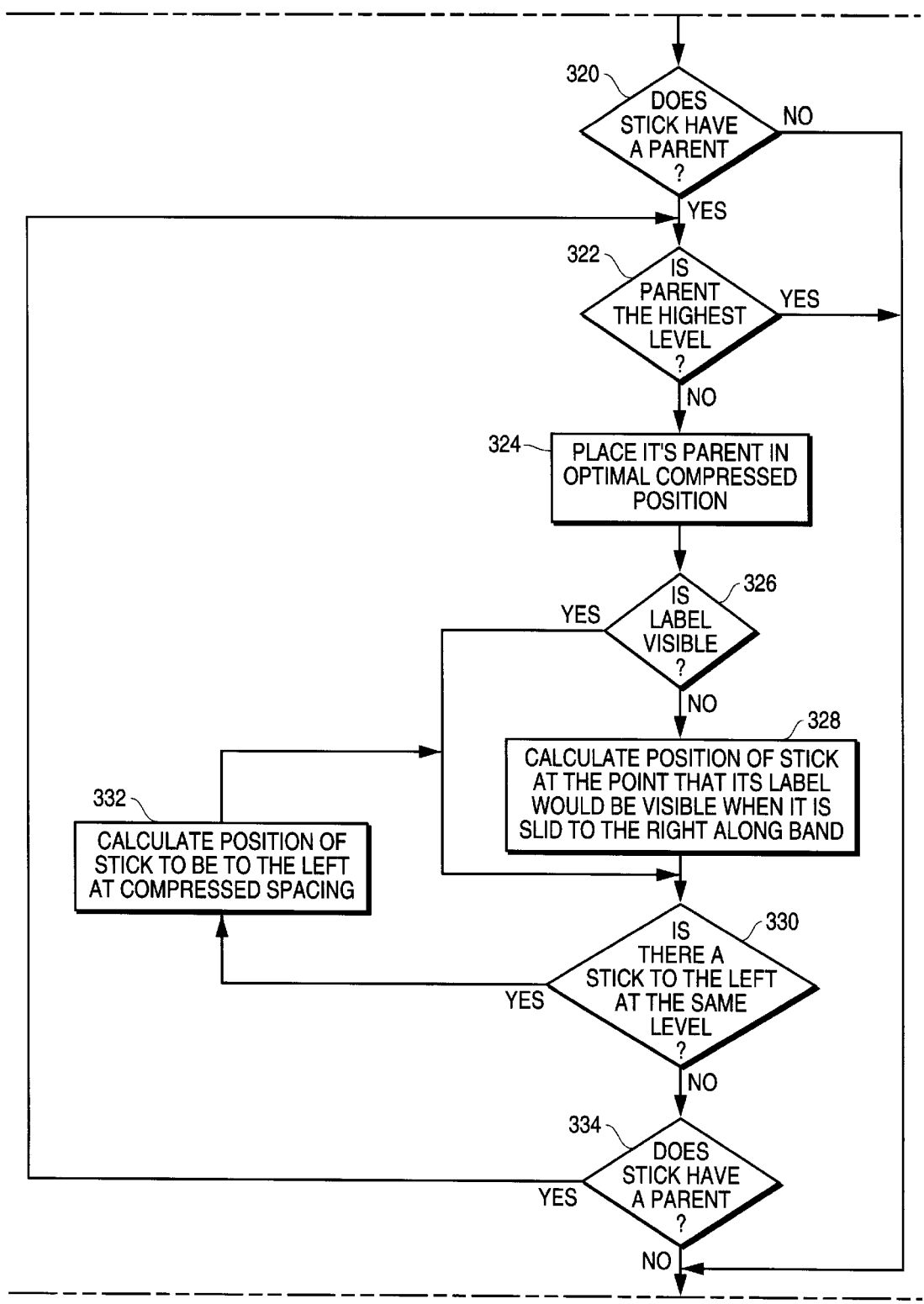
Figure 14C:
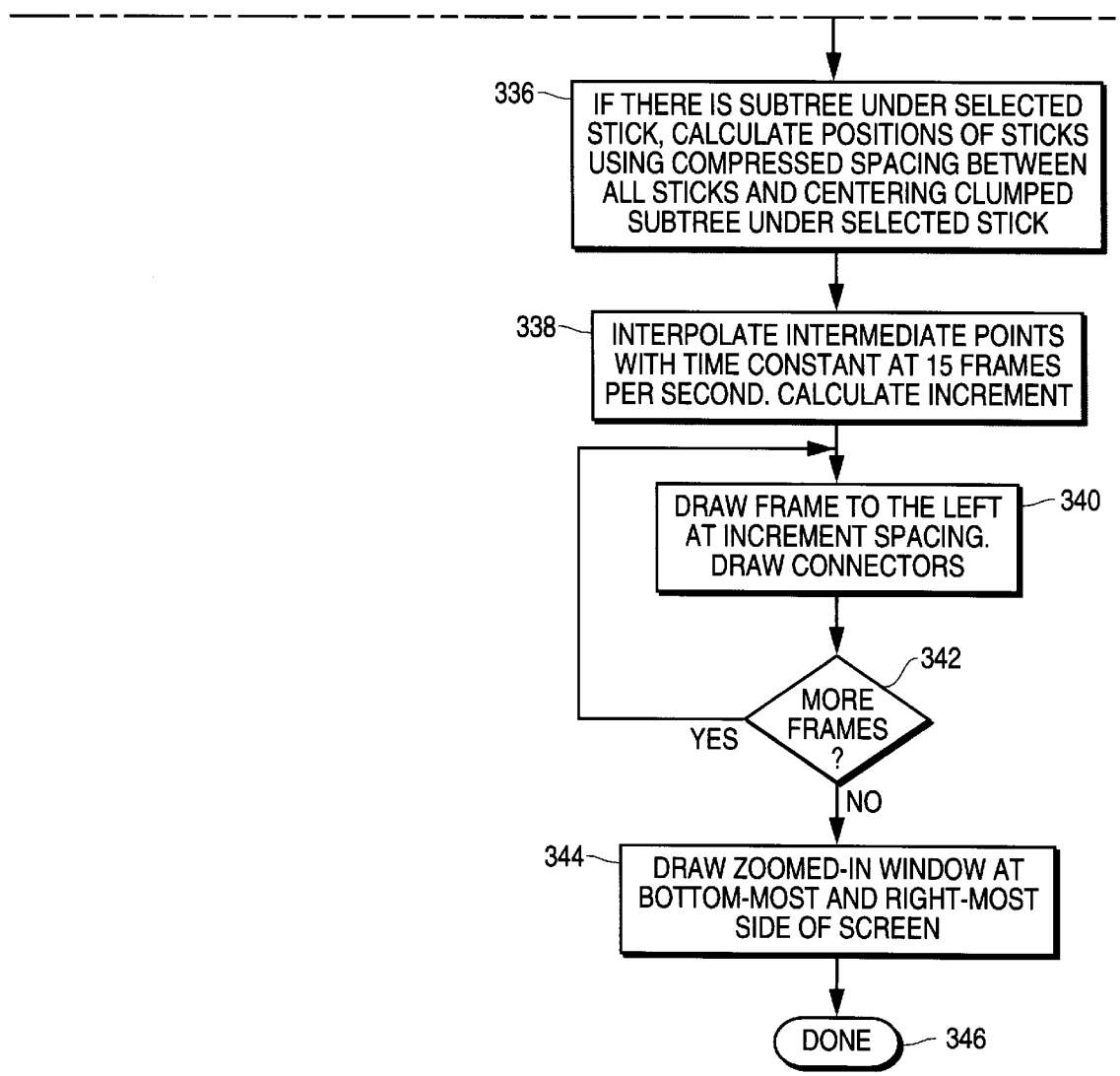

The present invention also proposes allowing a user, by double clicking on a node representation, to view the contents of the node, represented by the sphere icons 202, in a separate window. Referring specifically to FIG. 13, were a user, for example, to double click on the node representation 280 (i.e., either the stick or the string identifier), a window 282 is generated. The window 282 displays an appropriate icon 284 and identifier string 286 for the contents of the selected node, which were represented by the sphere icons 202 in the three-dimensional representation 172. FIGS. 14a–14c show a flow chart illustrating a method 300, according to one embodiment of the present invention, whereby the sub-tree including the selected node is shifted to the left of the three-dimension representation 172, so as to allow a simultaneous display of the node representation 280 and the window 282, as shown in FIG. 13. FIGS. 14a–14c show a flow chart illustrating a method 300 according to one embodiment of the invention and comprising steps 302–346, of generating the display in FIG. 13. The steps of the method 300 are apparent from the flow chart shown in FIG. 14a–14c.

Figure 15:
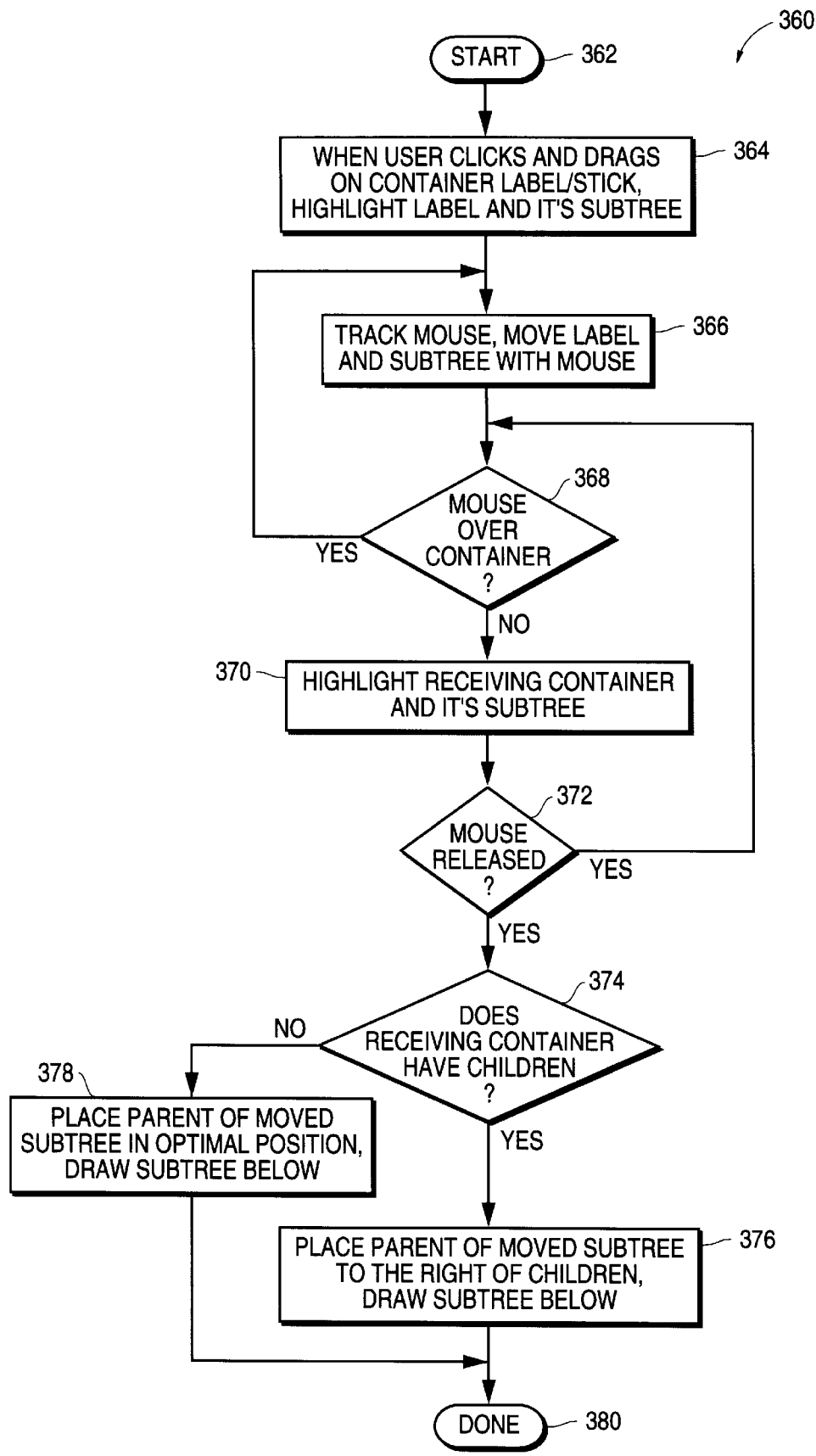
FIG. 15 is a flow chart illustrating a method, according to one embodiment of the present invention, of editing a hierarchical data structure.

FIG. 15 shows a flow chart illustrating a method 360 by which the three-dimensional representation 170 can be edited, by moving sub-trees from one location to another within the hierarchy. The method 360 comprises the steps 362–380, and the steps which comprise this method 360 are apparent from the flow chart.

Figure 16:
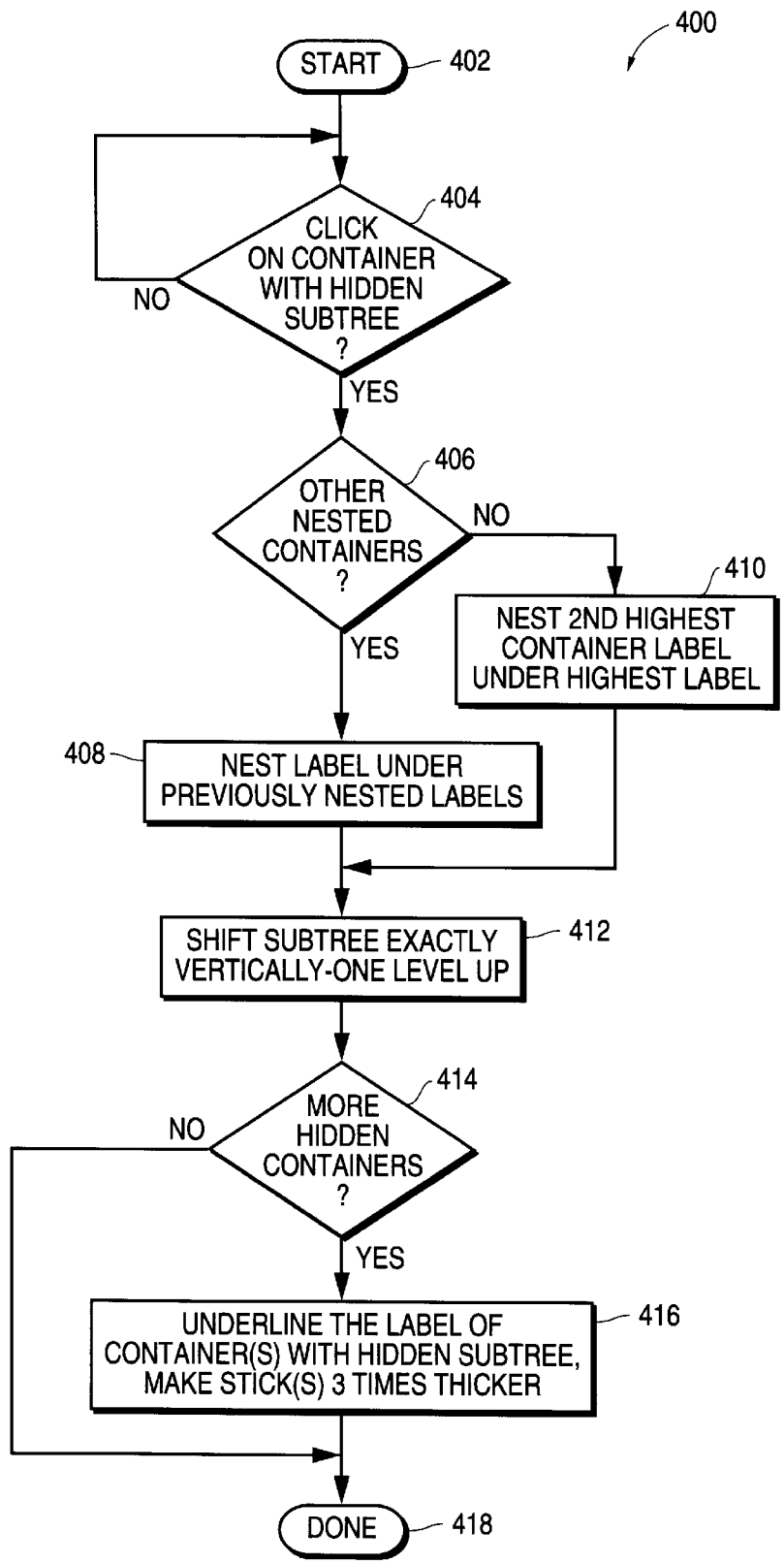
FIG. 16 is a flow chart illustrating a method, according to one embodiment of the present invention, of displaying hidden or contracted sub-trees by user selection of a parent node.

As described with reference to FIG. 7, if a sub-tree (or branch) is too deep to be displayed within the boundaries of a grid of a screen, children nodes may be contracted into a parent node, for which the node representation includes a thickened stick 182 and identifier string 180. A method 400 of displaying a hidden, or contracted, hierarchical node structure is illustrated in FIG. 16. The method 300 proposes shifting the hierarchy upwards, when a user clicks on a node representation indicating a hidden hierarchy, to then reveal the hidden hierarchical node structure contracted into the relevant parent node. This nesting feature allows the entire path of selected node to be viewed. The method 400 comprises steps 402–418, which are illustrated and described in FIG. 16.

Figure 17:
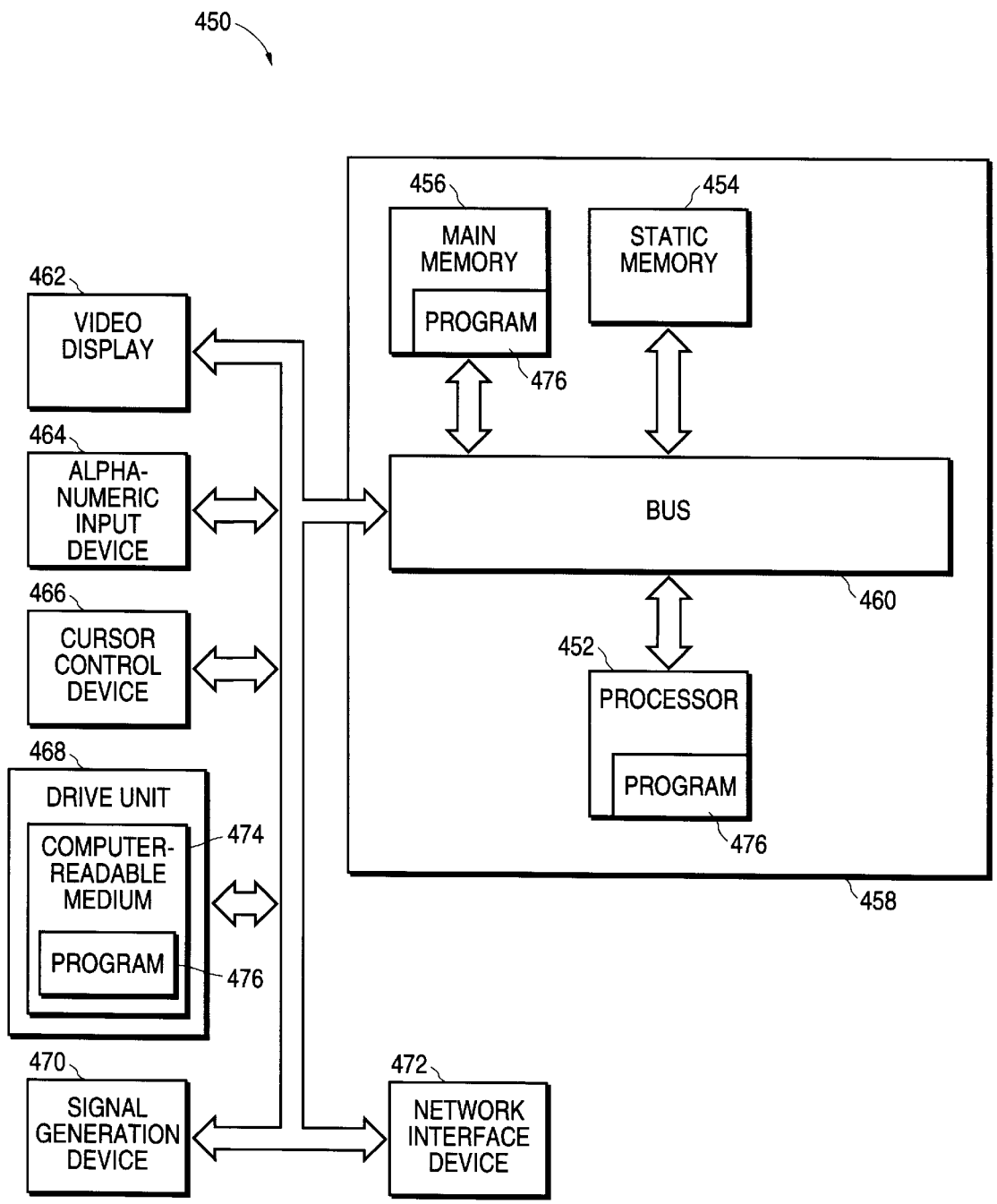
FIG. 17 is a block diagram illustrating a computer system including a computer-readable medium, having a computer program stored thereon, and a network interface device capable of transmitting and receiving a carrier signal incorporating a computer program.

FIG. 17 illustrates a computer system 450, which includes a processor 452, a static memory 454 and a main memory 456, all contained within a housing 458. The devices within the housing 458 communicate with each other, and with a number of peripheral devices located outside the housing 458 via a bus 460. The peripheral devices located outside the housing 458 include a video display 462, on which the two-dimensional and three-dimensional hierarchical data representations disclosed above, may be displayed. The video display 462 may comprise, merely for example, a CRT or a LCD. Other peripheral devices include an alphanumeric input device (e.g., a keyboard), and cursor control device 466 (e.g., a mouse), a drive unit 468 (e.g., a hard-disk drive), a signal generation device 47—(e.g., a microphone or a speaker), and a network interface device 472 (e.g., a Network Interface Card). The drive unit 468 includes a computer-readable medium 474, such as a magnetic disk platter, having stored thereon a program 476. The program 476 includes a sequence of instructions, which when executed by the processor 452, cause the processor to perform the steps of any one of the methods discussed above and illustrated in the accompanying drawings. The program 476 may reside either fully, or partially, within the main memory 456 or within the processor 452 as illustrated. The network interface device 472 is configured to receive and transmit a carrier signal, which may embody a sequence of instructions, which when executed by the processor 452, cause the processor 452 to perform the steps of any one of the methodologies discussed above and illustrated in the accompanying drawings.

Thus, a method of generating a three-dimensional representation of a hierarchical data structure has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of generating a three-dimensional representation of a hierarchical data structure for display on a display unit, the hierarchical data structure comprising a plurality of nodes arranged in a plurality of levels, each node representing a data item, the method comprising the steps of:

generating the hierarchical data structure;

assigning each node a pair of X and Y axis coordinates in a two-dimensional grid having X and Y axis which are perpendicular, so that nodes on a common level each have a common Y axis coordinate to define a Y line;

defining a Z axis with a predetermined angle relative to the X axis;

for each level, defining a Z line which is parallel to the Z axis;

for each level, mapping each node location on the respective Y line to a corresponding location on the respective Z line so as to recalculate at least the Y coordinate of each node;

displaying a node representation of each node at a respective first point defined at the respective X coordinate and the recalculated Y coordinates on the display unit; and displaying a respective connector representation between each parent and child node representation on the display unit so as to generate the three-dimensional representation.

2. The method of claim 1 wherein the step of mapping comprises recalculating, for each node, the Y coordinate to fall on the respective Z-line while maintaining a previously calculated X coordinate.

3. The method of claim 1 including the step of, for each level, shifting the level parallel to the X axis by recalculating the X coordinate for each node.

4. The method of claim 1 wherein each node representation extends from the respective first point to a second point, and wherein the step of displaying the connector comprises displaying a connector representation between the second point of a parent node and the first point of a child node so as to impart a stepped appearance to the three-dimensional representation.

5. The method of claim 4 wherein the first and second points for each node have a common X coordinate or a common Y coordinate.

6. The method of claim 1 wherein the first and second points for each node have a common X coordinate or a common Y coordinate.

7. The method of claim 1 including the step of recalculating the X coordinates of the nodes of each level, so that each level is substantially centered with respect to a preceding level.

8. The method of claim 1 including the step of recalculating the X and Y coordinates of each of the nodes according to a zoom factor input.

9. The method of claim 1 wherein the step of assigning each node a pair of X and Y axis coordinates in a two-dimensional grid comprises the steps of:

(a) determining a node gap value which indicates a spacing between nodes in a group of nodes having a common parent and being on a common level;

(b) determining a group gap value which indicates a spacing between the group of nodes and an adjacent group of nodes on the common level; and (c) for each group of nodes, calculating the X-axis coordinates for each node so that the spacing between adjacent nodes within a current group is equal to the node gap value; and (d) for each group of nodes, calculating the X-axis coordinates for each node so that the spacing between adjacent groups is at least the group gap value.

10. The method of claim 9 including the step of, for each group of nodes, calculating the X-axis coordinates so that the current group is substantially centered with respect to the parent of the current group.

11. The method of claim 9 including the step of determining whether the width of at least a portion of the current level is too large with respect to a previous level by a predetermined metric and, if so, decreasing the node gap value and/or the group gap value for the current level.

12. The method of claim 1 wherein the predetermined angle of the Z axis relative to the X axis is between 25 and 35 degrees.

13. The method of claim 1 wherein the node representation includes a sheared identifier string.

14. A computer-readable medium having stored thereon a sequence of instructions which, when executed by a processor, cause the processor to perform the steps of:

generating a hierarchical data structure, the hierarchical data structure comprising a plurality of nodes, each of which represents a data item;

assigning each node a pair of X and Y axis coordinates in a two-dimensional grid having X and Y axis which are perpendicular, so that nodes on a common level each have a common X axis coordinate to define a Y line;

defining a Z axis with a predetermined angle relative to the X axis;

for each level, defining a Z line which is parallel to the Z axis;

for each level, mapping each node location on the respective Y line to a corresponding location on the respective Z line so as to recalculate at least the Y coordinate of each node;

displaying a node representation of each node at a respective first point defined at the X coordinate and the recalculated Y coordinate on a display unit; and displaying a respective connector representation between each parent and child node representation on the display unit.

15. A computer data signal embodied in a carrier wave and representing a sequence of instructions which, when executed by a processor, cause the processor to perform the steps of:

generating a hierarchical data structure, the hierarchical data structure comprising a plurality of nodes, each of which represents a data item;

assigning each node a pair of X and Y axis coordinates in a two-dimensional grid having X and Y axis which are perpendicular, so that nodes on a common level each have a common X axis coordinate to define a Y line;

defining a Z axis with a predetermined angle relative to the X axis;

for each level, defining a Z line which is parallel to the Z axis;

for each level, mapping each node location on the respective Y line to a corresponding location on the respective Z line so as to recalculate at least the Y coordinate of each node;

displaying a node representation of each node at a respective first point defined at the X coordinate and the recalculated Y coordinate on a display unit; and displaying a respective connector representation between each parent and child node representation on the display unit.

\* \* \* \* \*